United States Patent
Kajiura et al.

[11] Patent Number: 5,907,382
[45] Date of Patent: May 25, 1999

[54] TRANSPARENT CONDUCTIVE SUBSTRATE AND DISPLAY APPARATUS

[75] Inventors: Sadao Kajiura, Kanagawa-ken; Toshiro Hiraoka; Akira Yoshizumi, both of Yokohama, all of Japan

[73] Assignee: Kabushiki Kaisha Toshiba, Japan

[21] Appl. No.: 08/573,636

[22] Filed: Dec. 18, 1995

[30] Foreign Application Priority Data

Dec. 20, 1994 [JP] Japan .................................. 6-317074
May 8, 1995 [JP] Japan .................................. 7-109479

[51] Int. Cl.$^6$ ................................................ G02F 1/1333
[52] U.S. Cl. ........................ 349/158; 349/161; 349/162
[58] Field of Search ................................ 349/158, 161, 349/162

[56] References Cited

U.S. PATENT DOCUMENTS

| | | | |
|---|---|---|---|
| 3,442,686 | 5/1969 | Jones . | |
| 4,970,131 | 11/1990 | Taniguchi et al. | 430/67 |
| 5,270,768 | 12/1993 | Murata | 355/219 |
| 5,569,332 | 10/1996 | Glatfelter et al. | 136/249 |

FOREIGN PATENT DOCUMENTS

| | | |
|---|---|---|
| 63-112632 | 5/1988 | Japan . |
| 1-113426 | 5/1989 | Japan . |
| 6-99536 | 4/1994 | Japan . |

OTHER PUBLICATIONS

Sakata et al., "A Novel Electron Beam Resist System—Acid Catalyzed Conversion of Poly(Di–t–Butoxysiloxane) Into Glass", Journal of Photopolymer Science and Technology, 5(1):181–190 (1992).

*Primary Examiner*—William L. Sikes
*Assistant Examiner*—Julie Ngo
*Attorney, Agent, or Firm*—Finnegan, Henderson, Farabow, Garrett & Dunner, L.L.P.

[57] ABSTRACT

A transparent conductive substrate, that has excellent heat resistant characteristic, shock resisting characteristic, chemical resisting characteristic, oxygen barrier characteristic, steam barrier characteristic, and scratch resisting characteristic while the substrate is easy to handle and has a thin, and light-weight structure, is provided. A display apparatus having such a transparent conductive substrate is also provided. The transparent conductive substrate comprises a transparent composite base having a transparent heat resisting resin base and a metallic oxide layer or a metallic nitride layer, the metallic oxide layer or the metallic nitride layer being formed on at least one of two main surface of the transparent heat resisting resin base, and a transparent electrode layer formed on the metallic oxide layer or the metallic nitride layer of the transparent composite base, wherein a coupling agent is coated on the metallic oxide layer or the metallic nitride layer of the transparent composite base, and wherein the metallic oxide layer or the metallic nitride layer has an exposed surface. In addition, a resin base mainly composed of thermosetting type allyated polyarylene ether is used.

28 Claims, 4 Drawing Sheets

TRANSPARENT CONDUCTIVE SUBSTRATE AND DISPLAY APPARATUS

BACKGROUND OF THE INVENTION

1. Field of the Invention

The present invention relates to a transparent conductive substrate for use with various types of display apparatuses and a display apparatus thereof.

2. Description of the Related Art

As technologies for satellite and mobile communications have advanced, light-weight display apparatuses for handy information terminal units have been developed. As substrates of the display apparatuses, transparent conductive substrates have been used.

A conventional transparent conductive substrate is constructed by forming a transparent electrode layer on a glass plate with a thickness of 0.7 to 1.1 mm. The glass plate has a heat resisting characteristic, a chemical resisting characteristic, and optical characteristics such as high light transmittance, low haze, and low retardation Since the transparent conductive substrate has a glass plate as a base, it can satisfactorily withstand a photo etching process and a sputtering process performed in an alignment film forming process and an electrode forming process that are performed in the fabrication of a liquid crystal display apparatus.

On the other hand, a handy information terminal unit should have a shock resisting characteristic and a light weight. However, when the thickness and weight of the glass plate are reduced, the shock resisting characteristic of the resultant plate becomes lower than that of the conventional glass plate. Thus, a technology for using plastics, which have high shock resisting characteristic and light weight, for a transparent conductive substrate has been required.

Thus far, many attempts for using plastic bases for liquid crystal display apparatuses have been made. To improve the display quality, transparent conductive substrates used for the liquid crystal display apparatuses should have for example an oxygen barrier characteristic, a steam barrier characteristic, and a scratch resisting characteristic. However, with only a plastic base, such characteristics cannot be accomplished.

To solve this problem, a method for forming a laminate of an oxygen barrier layer, a steam barrier layer, a hard coat layer as a protection layer for improving mechanical strength and chemical resisting characteristic, a variety of adhesive agent layers for improving adhesive characteristics between each layer, between the base and the adjacent layer, or between the transparent electrode layer and the adjacent layer and so forth on a plastic plate as a compound base for a transparent conductive substrate has been proposed. In this case, to form a transparent electrode layer an orientation film, the base should have a heat resisting characteristic.

However, the conventional plastic bases cannot satisfy both optical characteristics such as high light transmittance, low haze value, low retardation value, and so forth and high heat resisting characteristic that is required for the fabrication process of the transparent conductive substrate at the same time. In particular, both the high light transmittance and the high heat resisting characteristic cannot be satisfied at the same time. For example, to improve the heat resisting characteristic and thereby form a highly conjugated structure, an aromatic ring or a hetero ring is introduced in the main chain of a macromolecule compound that composes a plastic. In this case, the plastic is inevitably colored. Thus, the light transmittance of the visible portion is deteriorated. To improve the heat resisting characteristic, a high crystal structure is formed. In this case, the haze value and the retardation value increase. In consideration of both the high light transmittance and the high heat resisting characteristic, as examples of the plastic base, polycarbonate, polyarylate, polysulfone, polyethersulfone, and norbornene resin which has a norbornene structure are normally used. The thermally deforming temperatures of these materials are at most around 220° C. Thus, the heat resisting characteristic and the light transmittance should be further improved.

In addition, when an oxygen barrier layer, a steam barrier layer, a hard coat layer, various adhesive agent layers, and so forth are laminated as a base, since the heat resisting characteristic of these layers is low, a fabrication process of which the material temperature exceeds 170° C. cannot be used. From a view point of the heat resisting characteristics of such various protection layers, structures of which a metallic oxide thin film layer composed of SiOx, AlOx, or MgOx or a metallic nitride thin film layer composed of SiNx is formed as an oxygen barrier layer and a steam barrier layer on the base have been used (for example, Japanese Patent Laid-Open Publication Nos. 6-99536 and 63-112632, and U.S. Pat. No. 3,442,686).

These layers are formed by sputtering method, evaporation method, CVD method, or sol-gel method. In particular, when a metallic oxide thin film layer or a metallic nitride thin film layer that is free from a defect, they provide very good oxygen barrier characteristic and steam barrier characteristic. The oxygen barrier characteristic and the steam barrier characteristic of these layers are around 10 times higher than those of ethylene-vinylalcohol copolymer, polychloro vinylidene, or polypropylene. However, when the metallic oxide thin film layer or the metallic nitride thin film layer that have excellent barrier characteristics are densely formed, high temperatures are required in the crystallizing process. Thus, the required temperatures may exceed the heat resisting characteristic of the base.

Normally, to improve the adhesion of the base and the metallic oxide thin film layer or the metallic oxide thin film layer, a surface treatment is performed for the base. However, the effect of the surface treatment is not always satisfactory. To solve this problem, a protection layer composed of a thermoplastic resin is formed on the front surface of the metallic oxide thin film layer or the metallic nitride thin film layer. In addition, to improve the adhesion of the protection layer and an electrode material formed on the front surface thereof, an adhesive agent layer should be disposed between these layers. Alternatively, a proper surface process should be performed on the front surface of the protection layer. However, such an adhesive agent layer has a problem on the heat resisting characteristic. Thus, it is difficult to equally form a transparent electrode layers As described above, although the transparent conductive substrate is important for reducing the thickness and weight of a display apparatus, the transparent conductive substrate that has the conventional plastic base cannot satisfy both the optical characteristics such as high light transmittance, low haze value, and low retardation value and high heat resisting characteristic in comparison with the transparent conductive substrate that has a conventional glass material.

In addition, from a view point of the thermal process environment, it is difficult to form a metallic oxide thin film layer or a metallic nitride thin film layer that satisfies the oxygen and steam barrier characteristics and scratch resisting characteristic.

Moreover, when the metallic oxide thin film layer or the metallic nitride thin film layer is formed, the adhesion of the base and such thin film layers and of a transparent electrode layer and such thin film layers is deteriorated.

SUMMARY OF THE INVENTION

The transparent conductive substrate and the display apparatus therewith according to the present invention is made from the above-described view points. An object of the present invention is to provide a transparent conductive substrate having a base with both heat resisting characteristic and optical characteristics.

Another object of the present invention is to provide a transparent conductive substrate with a scratch resisting characteristic, an oxygen barrier characteristic, a steam barrier characteristic, and adhesion of a transparent electrode layer and a fabrication method thereof.

A further object of the present invention is to provide a small, thin, and light display apparatus having the above-described transparent conductive substrate.

A first aspect of the present invention is a transparent conductive substrate, comprising a transparent composite base having a transparent heat resisting resin base and a metallic oxide layer or a metallic nitride layer, the metallic oxide layer or the metallic nitride layer being formed on at least one of two main surfaces of the transparent heat resisting resin base, and a transparent electrode layer formed on the metallic oxide layer or the metallic nitride layer of the transparent composite base, wherein a coupling agent is treated on the metallic oxide layer or the metallic nitride layer of the transparent composite base, and wherein the metallic oxide layer or the metallic nitride layer has an exposed surface.

A second aspect of the present invention is a transparent conductive substrate, comprising a transparent heat resisting rein base having two main surfaces and a transparent electrode layer formed on the transparent heat resisting resin substrate, the transparent heat resisting resin base comprising a thermosetting type allylated polyarylene ether.

A third aspect of the present invention is a transparent conductive substrate, comprising a transparent composite base having a transparent heat resisting resin base and a silicon oxide layer, the silicon oxide layer being formed on at least one of two main surface of the transparent heat resisting resin base, and a transparent electrode layer formed on the silicon oxide layer of the transparent composite base, wherein the silicon oxide layer comprises by coating a solution of polyalkoxysiloxane containing a catalyst on the transparent heat resisting resin base and then drying the solution, by coating a solution of polysilane on the transparent heat resisting resin base and radiating an ultraviolet ray to the resultant base so as to optically oxidize polysilane, or by coating a solution of polysilazane on the transparent heat resisting resin base and hydrolyzing and oxidizing polysilazane.

A fourth aspect of the present invention is a display apparatus having the transparent conductive substrate of the first aspect or the second aspect.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Figure 1:
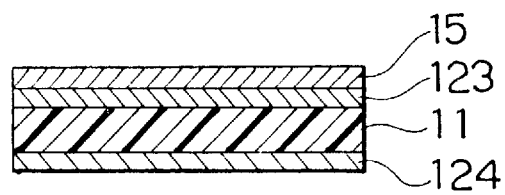
FIG. 1 is a sectional view showing an example of the structure of a transparent conductive substrate having a metallic oxide thin film layer or a metallic nitride thin film layer that is not densely composed according to the present invention.

A transparent conductive substrate according to the present invention comprises a transparent composite base having a transparent heat resisting resin base and a metallic oxide layer or a metallic nitride layer, the metallic oxide layer or the metallic nitride layer being formed on at least one of two main surface of the transparent heat resisting resin base, and a transparent electrode layer formed on the metallic oxide layer or the metallic nitride layer of the transparent composite base, wherein a coupling agent is treated on the metallic oxide layer or the metallic nitride layer of the transparent composite base, and wherein the metallic oxide layer or the metallic nitride layer has an exposed surface.

In the present invention, the base of the transparent conductive substrate is preferably a transparent heat resisting resin base of which the thermal deforming temperature is 210° C. or higher, the light transmittance is 85% or higher at 400 nm, the haze value is 0.5% or less at 550 nm, and the retardation value is 20 nm or less at 600 nm from view points of heat resisting characteristic and optical characteristics.

Examples of the transparent heat resisting resin base are acrylic resins such as polymethyl methacrylate, ester resins such as polyethylene terephthalate, amorphous polyolefins such as ZEONEX (trade name of Nippon Zeon Co., Ltd.), polycarbonates, polyarylates, polysulfones, polyethersulfones, norbornene resins such as ARTON (trademark of Japan Synthetic Rubber Co., Ltd.), thermosetting type allylated polyphenylene ethers such as A-PPE (trademark of Asahi Chemical Industry Co., Ltd.), acrylic esterated polyvinylphenols, and films and sheets of various types of compounds of which a curable functional group is introduced in a thermoplastic resin.

In particular, from a view point of the heat resisting characteristics, polycarbonates, polyarylates, polysulfones, polyethersulfones, norbornene resins such as ARTON (made by Japan Synthetic Rubber Co., Ltd.), and thermosetting type allylated polyphenylene ethers such as A-PPE made by Asahi Chemical Industry Co., are preferably used.

The thermosetting type allylated polyphenylene ether resin is composed by introducing an allyl group in polyphenylene ether. The allylated polyphenylene ether is a macromolecule compound expressed by the following formula and composed of components m and n. Since the allylated polyphenylene ether has an excellent heat resisting characteristic, it is suitable for the present invention.

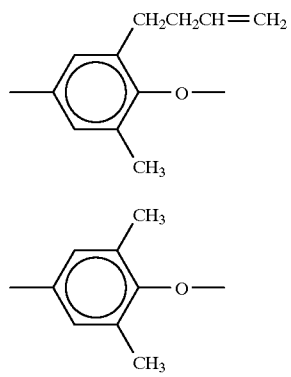

The ratio of the component denoted by m is preferably in the range from 0.01 to 0.30. The ratio of the component denoted by n is preferably in the range from 0.70 to 0.99. When m is smaller than such a range, the heat resisting characteristic is deteriorated. In contrast, when m is larger than such a range, the forming characteristic and the bending characteristic are deteriorated. The method for introducing the allyl group in the polyphenylene ether is not limited. For example, polyphenylene ether is reacted with butyl lithium in tetrahydrofuran. An allyl bromide group is reacted with the resultant substance. An example of the thermosetting type allylated polyphenylene ether is A-PPE, trade name of Asahi Chemical Industry Co., Ltd.. The thermosetting type allylated polyphenylene ether base is obtained by dissolving allylated polyphenylene ether and organic peroxide that is a polymerization initiator with a solvent such as trichloroethylene and by casting the resultant substance. The hardening process using the allyl group is performed for 30 minutes or one hour at 200° C. so that the allylated polyphenylene ether becomes a base with stable characteristics.

The resin base mainly composed of thermosetting type allylated polyphenylene ether has excellent optical characteristics such as low optical anisotropy and low haze value. The glass transition temperature of the resin base is as high as around 250° C. Thus, the resin base can be satisfactorily used in a thermal treatment of the fabrication process of the transparent conductive substrate in comparison with the conventional transparent heat resisting resin base with a glass transition temperature of at most 220° C. Thus, the resin base mainly composed of thermosetting type allylated polyphenylene ether has a more excellent heat resisting characteristic than the conventional resin base.

When the process temperature of which a transparent electrode layer of a transparent conductive substrate is formed is decreased in future, a transparent heat resisting resin with a lower heat resisting characteristic than the above-described resin can be used.

The thickness of the transparent heat resisting resin substrate is preferably in the range from 0.03 mm to 1 mm, more preferably in the range from 0.05 to 0.5 mm, further more preferably in the range from 0.05 to 0.4 mm, further more preferably in the range from 0.05 to 0.2 mm, most preferably in the range from 0.05 to 0.1 mm. As a reason for selecting the range of the thickness of the transparent heat resisting resin base, when the thickness thereof is too small, the strength thereof is deteriorated. When the thickness of the transparent heat resisting resin base is too large, a roll-to-roll continuous fabrication method cannot be used due to a problem on torque. Thus, the quantitative fabrication characteristic is deteriorated.

If an inorganic layer such as metallic oxide or metallic nitride is directly layered on the resin base, their adhesion characteristics are bad. To improve the adhesion characteristics, for example a chemical treatment or a surface roughing treatment is performed for the resin base.

These surface treatments are categorized as a physical treatment for forming a hydroxyl group, a carbonyl group, or a carboxyl group that is effective for the adhesion of the base and an organic substance such as silicon oxide on the front surface of the base and a chemical treatment for coupling the front surface of the base and the metallic oxide. Examples of the physical treatment are ultraviolet ray radiating process, corona discharging process, glow discharging process, plasma discharging process, torch discharging process, and reverse sputtering process. Examples of the chemical treatment are various types of coupling agent treatments and pre-treatments of which an adhesive agent layer or an anchor coat layer is formed on the front surface of the base. These treatments are properly selected corresponding to the characteristics of the resin base for use. In addition, a plasma source in the plasma process, is properly selected. A positive corona or a negative corona in the corona treatment is properly selected.

Moreover, by a treatment with a strong acid or a strong base, an active functional group can be introduced on the front surface of the base.

Examples of the coupling agent for accelerating the coupling of the base and an inorganic substance that is coated on the base are vinyl silanes such as tetramethoxysilane, tetraethoxysilane, tetraacetoxysilane, methylethoxysilane, phenylmethoxysilane, vinyl tris (β-methoxyethoxy) silane, and vinyltrimethoxysilane, epoxy silanes such as γ-chloropropyltrimethoxysilane, γ-mercaptopropyltrimethoxysilane, and γ-glycidoxypropyltrimethoxysilane, acrylic silanes such as γ-methacryloxypropyltrimethoxysilane, and amino silanes such as γ-aminopropylethoxysilane, N-(β-aminoethyl)-γ-aminopropyltrimethoxy silane. The examples of the coupling agent include a substance of which part or all of the alcoxy group and acetoxy group are substituted with hydroxyl group. In addition, the examples of the coupling agent include a substance of which parts of the substituted hydroxyl groups are naturally condensed. Moreover, the examples of the coupling agent include titanate group coupling agents, borane group coupling agents, and zirconium group coupling agents. When such a coupling agent with a thickness of 0.5 to 10 nm is formed on the base, the coupling agent provides an adhesive function.

Examples of a sheet adhesive agent layer or an anchor coat layer that is formed on the resin base are polyethylene imines, isocianates, polyurethane polyesters, polyamides, polyethylenes, and polyesters. The thickness of the anchor coat layer or the adhesive agent layer is normally 10 μm or less. When the thickness of these layers is too large, the adhesive force is deteriorated.

Examples of the metallic oxide layer are oxide layers composed of aluminum, silicon, zinc, and magnesium. An example of the metallic nitride layer is a silicon nitride layer.

From view points of adhesion characteristic and transparent characteristic of the thin film layer, an oxide layer composed of aluminum, silicon, or magnesium and a nitride layer composed of silicon are preferably used.

The metallic oxide layer or the metallic nitride layer are normally formed by an evaporation method using resistance heating method or high frequency induction heating method, another evaporation method using electron beam method, a sputtering method, an ion plating method, or the like. These layers should not be always stoichiometrily composed. This is because both the transparent characteristic and barrier characteristics should be satisfied at the same time. As the composition of for example silicon oxide, x of SiOx is preferably selected from x=1.3 to 1.8. Likewise, as the composition of aluminum oxide, x of AlOx is preferably selected from x=1.2 to 1.5. As the composition of magnesium oxide, x of MgOx is preferably selected from x=1.3 to 1.8. As the composition of silicon nitride, x of SiNx is preferably selected from x=1 to 1.3.

In addition, the metallic oxide layer or the metallic nitride layer can contain a metal such as aluminum, magnesium, copper, steel, or tangusten, an oxide thereof, or a nitride thereof as allowable impurities as long as the impurities do not exceed 5 weight %.

The thickness of the metallic oxide layer or the metallic nitride layer is preferably in the range from 10 to 2000 nm, more preferably in the range from 20 to 1000 nm, further more preferably in the range from 20 to 100 nm. When the thickness of these layers is too small, the barrier characteristics are deteriorated. When the thickness of these layers is too large, the denseness characteristic of the layers is deteriorated.

After the metallic oxide layer or the metallic nitride layer is formed, a high energy plasma for example argon plasma can be radiated to the resultant structure so as to improve the adhesion of the front surface of the base and these thin films and the denseness of these thin films.

The resultant metallic oxide layer or the metallic nitride layer has many pores. According to the present invention, the pores are filled with a coupling agent as a binder.

Examples of the coupling agent treated on the metallic oxide layer or the metallic nitride layer are silane coupling agents such as vinyl silane, acrylic silane, amino silane, and epoxy silane. In particular, polymerizing silanes such as vinyl silane or acrylic silane or silane coupling agent having a silane group that mutually reacts is used in combination. Examples of the polymerizing silane are vinyl tris (β-methoxyethoxy) silane and γ-methacryloxypropyltrimethoxysilane. An example of the silane coupling agent having such a silane group is a combination of amino silane coupling agent and epoxy silane coupling agent. A method of which amino silane treatment is followed by epoxy silane process is preferably used. In this case, due to the reaction of amino group and epoxy group, a reinforcing film for the metallic oxide layer or the metallic nitride layer is formed. From a view point of a water resisting characteristic of the reinforcing film, to prevent excessive amino group from being exposed, amino silane coupling agent is used before epoxy silane coupling agent. In addition, the fitting characteristic and wetting characteristic of amino group against the base are higher than those of epoxy group against the base. Thus, examples of amino silane coupling agent are γ-aminopropylethoxysilane and N-(β)-aminoethyl)-γ-aminopropyltrimethoxy silane. An example of epoxy silane coupling agent is γ-glycidoxypropyltrimethoxysilane.

In addition to silane coupling agents, other coupling agents such as titanate group coupling agent, borane group coupling agent, and zirconium group coupling agent can be used. Amount these coupling agents, a polymerizing coupling agent or a combination of coupling agents with groups that mutually react is preferably used. However, the metallic oxide layer or the metallic nitride layer is a silicon oxide layer or a silicon nitride layer, from a view point of the fitness therewith, silane coupling agent is preferably used.

Such a coupling agent with a low concentration of 1 weight % or less is dissolved with a solvent such as isopropyl alcohol that has a good affinity with the metallic oxide layer or the metallic nitride layer. Thus, the pores of the metallic oxide layer or the metallic nitride layer are filled with the coupling agent. Thereafter, the resultant film is dried and cured at around 110° C. for 30 minutes. As a result, a layer with a thickness of 0.5 to 10 nm is formed. Thus, the denseness of the metallic oxide layer or the metallic nitride layer is improved and thereby the adhesion to the base and the like is improved. A non-polymerizing silane can be used as a mixture with another organic monomer such as diallylphthalate with a transparent characteristic and a heat resisting characteristic. In the present invention, after the coupling agent treatment is finished, part of the metallic oxide or the metallic nitride should be exposed.

The metallic oxide layer can be formed by another method instead of the evaporation method or the sputtering method. For example, by coating a solution containing a material selected from metallic alkoxide, metallic carboxylic acid, metallic acetylacetate, and metallic halide to a base and drying the solution, a metallic oxide layer can be formed.

Examples of metallic alkoxide, which is a starting material of the silicon oxide layer, are tetramethoxysilane, tetraethoxysilane, tetrabutoxysilane, methyltrimethoxysilane, methyltriethoxysilane, and phenyltriethoxysilane. Among these examples, tetramethoxysilane, tetraethoxysilane, and tetrabutoxysilane are preferably used. When a film contains an organic group other than alkoxyl group as a substitution group of silicon, the film may have a high forming characteristic. However, the oxygen barrier characteristic, the steam barrier characteristic, the heat resisting characteristic, and so forth of the film are deteriorated. That is the reason why the metallic alkoxides are preferably used.

Examples of metallic carboxylic acid salt, which is a starting material of metallic oxide such as a silicon oxide layer, are tetraacetoxysilane and di-t-butoxydiacetoxysilane. This is because the molecular weight of the carboxylic acid portion is relatively low. After the material is hardened, the amount of residue of the carboxylic acid portion in the film is small. Thus, the silicon oxide layer can be densely formed. In addition, since the amount of residual acid is small, the metallic oxide layer can be prevented from corroding and collecting ion impurities.

Examples of metallic halide, which is a starting material of metallic oxide such as a silicon oxide layer, are tetrachlorosilane, methyltrichlorosilane, phenyltrichlorosilane, methoxysilane, di-t-butoxydichlorosilane. Among these example, tetrachlorosilane is preferably used. This is because an organic group does not reside in the oxide layer that is produced.

In the above description, compounds of silicon are exemplified as inorganic substances. Examples of metals of metallic alkoxide, metallic acetylacetate, metallic carboxylic acid salt are aluminum, titanium, magnesium, indium, nickel, zinc, zirconium, and tin. When such a metal compound is hardened, a metallic oxide layer can be formed as with each of the above-described silicon compounds:

The metallic alkoxide, metallic carboxylic acid, or metallic halide is dissolved with a solvent that does not affect the base. The the resultant solution is coated on the base by one of various coating methods. Thereafter, inorganic acids such as hydrochloric acid, acid anhydrides such as trimellitic anhydride, metallic salts of carboxylic acid such as sodium acetate, perchlorates such as ammonium perchlorate, metallic chelate compounds such as tris (acetylacetate) aluminum, or tris (salicylaldehyde) ammonium, organic metallic compounds such as tetrabutyltitanate, or catalysts such as amine, alkali, or chloride, preferably, amine, acid anhydride, metallic salt of carboxylic acid, or metallic chelate compound of 0.01 to 10 weight parts is reacted with the starting material per 100 weight parts. Thereafter, the resultant substance is simply dried or heated and thereby a metallic oxide layer is formed.

The metallic oxide layer that is formed in such a manner becomes a more dense fine particle layer than that formed by for example an evaporation method using resistance heating method or high frequency induction heating method, another evaporation method using electron beam method, a sputtering method, or an ion plating method. Thus, the adhesion of the metallic oxide layer and the transparent electrode layer is improved. In addition, the metallic oxide layer has satisfactory chemical characteristics, oxygen barrier characteristic, and steam barrier characteristic.

Consequently, the metallic oxide layer or the metallic nitride layer according to the present invention has a satisfactory scratch resisting characteristic along with the satisfactory heat resisting characteristic, optical characteristics, transparent characteristic, oxygen barrier characteristic, and steam barrier characteristic. Thus, when the metallic oxide layers or the metallic nitride layers are formed on both surfaces of the base, another metallic oxide layer or metallic nitride layer that does not have a transparent electrode layer has a scratch resisting characteristic required for the transparent conductive substrate. When such an inorganic substance is exposed, the adhesion characteristic with the transparent electrode layer is remarkably improved.

In addition, according to the present invention, when a transparent electrode layer is formed, a film forming defect of which the transparent electrode layer is peeled off due to a stress caused by the difference of linear thermal expansion coefficients of the base and the transparent electrode layer can be prevented. This is because the composite layer of for example silicon oxide and a coupling agent becomes a cushioning layer between the base composed of an organic substance and the transparent electrode layer composed of an inorganic substance.

In the present invention, when the transparent electrode layer is formed, to improve the adhesion of the base and the transparent electrode layer, the metallic oxide layer or the metallic nitride layer is exposed. In addition, to improve the smoothness, the front surface of the coupling agent layer formed on the metallic oxide layer or the metallic nitride layer is abraded so that the metallic oxide layer or the metallic nitride layer directly contacts the transparent electrode layer.

As an example of the abrading method, for example polyurethane mat and a substance to be abraded are relatively moved while water containing dispersed cerium oxide is being splashed thereon. To have an abrasion margin for several to several ten angstroms, the particle size and amount of cerium oxide, abrading time, and abrading layer are properly selected.

When the transparent electrode layer is formed on the abraded surface, the transparent conductive substrate according to the present invention is obtained. Examples of the transparent electrode layer are $In_2O_3$-$SnO_2$ mixed type (ITO), $TiO_2$/Ag/$TiO_2$, $Bi_2O_3$/Au/$Bi_2O_3$, $SnO_2(F)$, $CdSnO_3$, and $V_2O_5 \cdot nH_2O$.

The transparent electrode layer according to the present invention is formed by the same process as the conventional transparent electrode forming process. In other words, the substrate is rinsed, after a transparent conductive layer is formed, a resist is peeled off by a photo etching method, a chemical etching method, or a solvent. Thereafter, the front surface of the transparent conductive layer is anode-oxidized. As a result, the transparent electrode layer is obtained.

Another transparent conductive substrate according to the present invention comprises a transparent heat resisting resin base with two main surfaces, and a transparent electrode layer formed on the transparent heat resisting resin base, wherein the transparent heat resisting resin base comprises thermosetting type allylated polyarylene ether. As the thermosetting type allylated polyarylene ether, a thermosetting type allylated polyarylene ether resin is used.

Most of transparent heat resisting resin bases other than the thermosetting type allylated polyarylene ether resin are formed by an extrusion forming method. On the other hand, a resin base mainly composed of a thermosetting type allylated polyarylene ether resin is polymerized after casting a solution of a not-hardened substance. Thus, the resin base mainly composed of the thermosetting type allylated polyarylene ether resin has excellent optical characteristics and heat resisting characteristic.

A bonding layer is preferably formed between the transparent heat resisting resin base mainly composed of thermosetting type allylated polyarylene ether and the transparent electrode layer. Examples of the bonding layer are a metal oxide layer or a metal nitride layer that also functions as an oxygen/steam barrier layer and a metallic oxide layer or metallic nitride layer treated with the above-described silane coupling agent. However, the bonding layer according to the present invention can be a conventional adhesive agent layer with a transparent electrode layer. Other examples of the bonding layer are an oxygen barrier layer, a steam barrier layer, and a hard coat layer that is a protecting layer for improving mechanical strength and chemical resisting characteristics. The transparent electrode layer can be the same as that of the above-described aspect of the present invention.

A fabrication method of the transparent conductive substrate according to the present invention comprises the steps of forming a metallic oxide layer or a metallic nitride layer on at least one of two main surfaces of a transparent heat resisting resin base, performing a coupling agent treatment for the metallic oxide layer or the metallic nitride layer, abrading the coupling agent layer formed by the coupling agent treatment until metallic oxide or metallic nitride is exposed, and forming a transparent electrode layer on the abraded surface Next, the step for forming a silicon oxide layer, which is a metallic oxide layer, will be described.

In a first method for forming a silicon oxide layer, a solution of polyalkoxysiloxane containing a catalyst is coated on the surface of a transparent heat resisting resin base and then the resultant film is dried.

Preferable examples of the polyalkoxysiloxane compound, which is used as a starting material for forming the silicon oxide layer according to the present invention, are polydialkoxysiloxanes and polyalkyl (allyl) alkoxysiloxanes. Examples of polydialkoxysiloxane group are poly (diethoxysiloxane), poly (dipropoxysiloxane), poly (di-t-butoxysiloxane), and poly (ethoxybutoxysiloxane). Among these examples, poly (di-t-butoxysiloxane) is preferably used because it has an excellent preservative characteristic.

As an example of polyalkyl (allyl) alkoxysiloxane, polysiloxane expressed by the following chemical formula is preferably used.

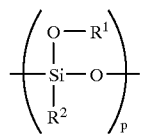

In the formula, p represents the degree of polymerization. $R^1$ and $R^2$ represent one selected from alkyl group, aryl group, and aralkyl group that are substituted with a hydrogen atom or not substituted therewith. In addition, $R^1$ can be the same as $R^2$. The number of carbons of $R^1$ and $R^2$ is in the range from 1 to 15. Preferable examples of $R^1$ are methyl group, ethyl group, propyl group, isopropyl group, butyl group, t-bytyl group, and phenyl group. Preferable examples of $R^2$ are a hydrogen atom, methyl group, ethyl group, propyl group, isopropyl group, butyl group, t-butyl group, phenyl group, aryl group, vinyl group, and glycidyl group. In particular, when $R^2$ is a mixture of aryl group, vinyl group, and hydrogen atom and sodium chloplatinate is used as a catalyst, the film qualify is improved. When glycidyl group is used, the adhesion to the substrate is improved. The degree of polymerization of polyalkoxysiloxane according to the present invention is preferably in the range from 5 to 10000, more preferably in the range from 20 to 2000. When the degree of polymerization is in such a range, polyalkoxysiloxane has an excellent solubility to an organic solvent. Thus, the resultant film is densely formed. The end group of polyalkoxysiloxane is not limited. Examples of the end group are hydroxyl group, alkoxyl group, and siloxyl group.

After a catalyst is added to such a polyalkoxysiloxane compound, when the resultant substance is coated and dried, preferably by a heat process at 80 to 170° C., a silicon oxide layer is obtained. Examples of the catalyst are aqueous ammonia, amines such as triethanolamine and ethanolamine, alkalies such as sodium hydroxide, inorganic acids such as hydrochloric acid, nitric acid, and phosphoric acid, organic acid, for example, carboxylic acids such as acetic acid and oxalic acid, acid generating agent by light and acid generating agent by heat Other examples of the catalyst are acid anhydrides such as trimellitic anhydride, metallic salts of carboxylic acid such as sodium acetate and zinc octylate, perchlorates such as ammonium perchlorate and magnesium perchlorate, metallic chelate compounds such as aluminum acetylacetnate and zirconium acetylacetnate, organic metallic compounds such as tetrabutyl titanate and dibutyl tin laurate, and chlorides such as aluminum chloride, ferrous chloride (II), zinc chloride (II), and sodium chloroplatinate.

The mixing ratio of such a catalyst to polyalkoxysiloxane is not limited. However, the mixing ratio is preferably in the range from 0.1 to 40 weight %, more preferably in the range from 0.5 to 20 weight %, further more preferably in the range from 1 to 5 weight %. When the amount of the catalyst is too small, the hardness becomes insufficient. Thus, the heating temperature necessary for hardening the film rises. When the amount of the catalyst is too large, the mechanical strength, gas barrier characteristic, and electric characteristics are deteriorated. The resultant silicon oxide film is densely and continuously formed.

In a second method for forming a silicon oxide layer, after a solution of polysilane is coated on at least one of two main surfaces of a transparent heat resisting resin base, an ultraviolet ray is radiated thereto. Thus, the polysilane is photooxidized. At this point, by performing a heat process preferably at 80 to 170° C. after the photo-oxidizing process, a better silicon oxide layer can be obtained.

Examples of the polysilane compound, which is used as a starting material for forming the silicon oxide layer corresponding to the second method, are poly (dimethylsilylene), poly (methylphenylsilylene), poly (dihexylsilylene), poly (cyclohexylsilylene), poly (propylphenylsilylene), poly (butylphenylsilylene), and poly (phenylhydrosilylene). In particular, among these examples, poly (methylphenylsilylene and poly (phenylhydrosilylene are preferably used. This is because such a polysilane compound is easily photo-oxidized with an ultraviolet ray. In particular, poly (phenylhydrosilylene) is preferably used because a silicon oxide layer that is densely and three-dimensionally cured can be easily formed. The molecular weight of polysilane is preferably in the range from 500 to 5,000,000, more preferably in the range from 1,000 to 500,000.

In other words, such polysilane has a good solubility to an organic solvent. Thus, with polysilane, a silicon oxide layer can be densely formed.

After a solvent of such polysilane is coated on the base, the resultant film is dried so as to remove the solvent. As a result, a polysilane thin film is formed. By radiating an ultraviolet ray to the polysilane thin film, polysilane is photo-oxidized. As a result, siloxane or silanol is obtained. By heating the resultant film, due to mutual reaction, a thin film of silicon oxide is obtained. At this point, by adding a catalyst that is used for polysiloxane group to a solution of polysilane, the reaction and cure are more properly performed after the photo-oxidizing process.

In a third method of forming a silicon oxide layer, a polysilazane layer is formed on one surface of a transparent heat resisting resin base. By hydrolysis and oxidizing reaction of polysilazane, a silicon oxide layer is formed.

Polysilazane is a macromolecule compound containing a structure unit represented by $H_2SiNH$ in a molecule.

Polysilazane is prepared by for example pyridine complex method of which silane halide group and excessive ammonium are reacted in a solvent of pyridine. NMR and elementary analysis show that the chemical structure of polysilazane contains a straight chain component and a cyclic component. According to the elementary analysis, the main component of polysilazane is perhydropolysilazane mainly composed of Si, H, and N. Polysilazane also contains small amounts of 0 atoms and C atoms. The amounts of impurities such as chlorine and alkaline metals contained in polysilazane are very small. Since a gas is placed in an organic solvent and chlorine is trapped with pyridine, polysilazane is obtained. Thus, polysilazane naturally contains an irregular cyclic component. However, when polysilazane contains many linking components, it tends to be gelled. Thus, polysilazane preferably contain a straight chain component and a cyclic component as long as it can be dissolved with an organic solvent. The average molecular weight of polysilazane that is mainly composed of perhydropolysilazane is preferably in the range from 600 to 2000, more preferably in the range from 700 to 1400. The viscosity of polysilazane dissolved with a solution of xylene of 20 weight % is in the range from $1 \times 10^{-3}$ to $1 \times 10^{-2}$ pa. s (at 25° C.). When the viscosity of polysilazane exceeds $1 \times 10^{-2}$ Pa. s, the solubility to a solvent is deteriorated.

In particular, preferable polysilazane according to the present invention is oligomer with a relatively high molecular weight and including a cyclic structure. An example of polysilazane can be expressed by the following chemical formula. This compound is soluble in various organic solvents, in particular, aromatic type solvent and ester type solvent.

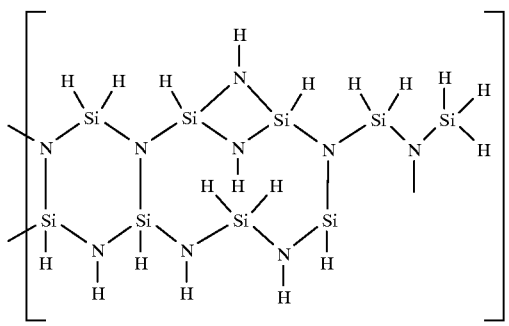

Such polysilazane is commercially available from, for example, Tonen Corporation as Tonen Polysilazane (low temperature baked type grade).

To convert polysilazane into a silicon oxide, if polysilazane is simply heated, it takes several hours at a high temperature of around 250° C. However, such a converting process that takes a long time at a high temperature is not practical. The transparent heat resisting resin base cannot withstand such a high temperature. However, the inventors of the present invention discovered the method for accelerating the conversion to silicon oxide at a lower temperature.

In other words, the above-described polysilazane is dissolved with a predetermined organic solvent as a solution with a predetermined concentration. The resultant solution is coated on the transparent heat resisting resin base. Examples of the coating method are dip coating method, roll coat method, spray coat method, and spin coat method. After the solution is coated on the transparent heat resisting resin base, the resultant base is dried at a temperature lower than the withstand temperature of the base. As a result, a polysilazane layer is obtained. Thereafter, by hydrolysis and oxidizing reaction of the dried film, a converting reaction to silicon oxide is accelerated at a low temperature. The oxidizing reaction can be performed for example by exposing the polysilazane film to ozone or dipping it in a solution of hydrogen peroxide. On the other hand, the hydrolysis reaction can be performed by exposing the polysilazane film to a high temperature and high humidity atmosphere.

After such processes are performed, when the polysilazane film is baked at a temperature in the range from 100 to 150° C., the polysilazane film is converted to a silicon oxide layer. The situation of which the polysilazane film is converted to the silicon oxide is observed by an infrared ray absorption spectrum. In other words, the infrared ray absorption decreases due to Si—N bond, N—H bond, and Si—H bond. In addition, the infrared ray absorption increases at a wave number of around 1100 cm$^{-1}$ due to Si—O bond. Finally, the conversion to $SiO_2$ is confirmed by SIMS.

The transparent heat resisting resin base and the transparent electrode layer used in the fabrication method of the transparent conductive substrate are the same as those used in the above-described aspect of the present invention. In addition, to improve the adhesion of the transparent heat resisting resin base and the silicon oxide layer, the above-described chemical process and surface roughing process can be performed.

The transparent heat resisting resin base according to the present invention is preferably a transparent heat resisting base that is mainly composed of thermosetting type allylated polyphenylene ether, which has excellent heat resisting characteristic and hydrolysis resisting characteristic. In this case, the thickness of the transparent heat resisting resin base is preferably in the range from 0.03 to 0.2 mm. The thickness of the silicon oxide layer is preferably in the range from 10 nm to 2000 nm.

Other examples for forming a silicon oxide layer are an evaporation method and a method using a solution of hexafluorosilicic acid. In particular, by the method using a solution of hexafluorosilicic acid, a silicon oxide layer can be equally formed.

Next, the method using a solution of hexafluorosilicic acid will be described.

With reference to formulas 1, 2, and 3, the theory of the method for forming a silicon oxide layer on a base will be described. Formula 1 represents the case that boric acid is added to a solution of hexafluorosilicic acid supersaturated with silica. Formula 2 represents the case that a metal such as aluminum is added to a solution of hexafluorosilicic acid containing supersaturated silica. Formula 3 represents the case that a solution of hexafluorosilicic acid is heated.

$H_2SiF_6 + 2H_2O \leftrightharpoons SiO_2 + 6HF$ $H_3BO_3 + 4HF \leftrightharpoons BF_4^- + H_3O^+ + 2H_2O$ (1)

$H_2SiF_6 + 2H_2O \leftrightharpoons SiO_2 + 6HF$ $2Al + 6HF \leftrightharpoons 2AlF_3 + 3H_2$ (2)

$H_2SiF_6 + 2H_2O \leftrightharpoons SiO_2 + 6HF$ (3)

In addition, Formula 1 represents that since boric acid is added, the equilibrium condition of a solution of hexafluorosilicic acid containing supersaturated silica is lost, HF is consumed, and $SiO_2$ is deposited on the base. Likewise, formula 2 represents that since aluminum is added, the equilibrium condition of a solution of hexafluorosilicic acid supersaturated with silica is lost, HF is consumed, and $SiO_2$ is deposited on the base. Formula 3 represents that since hexafluorosilicic acid is heated, the equilibrium condition is shifted to the right and $SiO_2$ is deposited on the base. Thus, in the method using a solution of hexafluorosilicic acid, as long as the equilibrium condition is shifted to the right in the hydrolysis reaction of hexafluorosilicic acid, by other than the above-described method, $SiO_2$ can be deposited on the base. In addition, a combination of formulas 1, 2, and 3 may be used.

In formula 1, as the adding speed of boric acid is increased, the forming speed of the silicon oxide layer is increased. As the temperature of the solution rises, the equilibrium condition is more shifted to the right and the forming speed of silicon oxide is increased.

Examples of the silica source supersaturated in the solution of hexafluorosilicic acid are silica gel, aerogel, silica glass, and other compounds that contain silica.

Boric acid with a dissolving amount in the range of $5\times10^{-4}$ mol/Hr to $1\times10^{-3}$ mol/Hr is preferably added to a solution of hexafluorosilicic acid with a concentration in the range of 0.5 to 4.0 mol/l in which silica is dissolved in supersaturated condition per 1 mol of hexafluorosilicic acid at a room temperature. Aluminum is preferably dissolved in the range from $1\times10^{-3}$ mol/Hr to $4\times10^{-3}$ mol/Hr per 1 mol of hyxafluorosilicic acid. When the dissolving amount of boric acid is too small, the depositing speed of the silicon oxide becomes slow. When the dissolving amount of boric acid is too large, the deposition of particle hexafluorosilic acid is superior to the deposition of silicon oxide. Thus, a silicon oxide layer cannot be equally formed.

To prevent the particle hexafluorosilic acid from depositing, before the resin base is dipped in the solution of hexafluorosilicic acid, the solution of hexafluorosilic acid in which silica is dissolved in the supersaturated state is filtered. While the hexafluorosilic acid layer is being formed, the solution is preferably circulated through the filter.

While silicon oxide is being formed, the temperature of the solution of hexafluorosilicic acid is preferably raised to 35 to 70° C. As the temperature rises, the depositing speed of silicon oxide increases. However, in this case, particle hexafluorosilic acid tends to deposit.

Thus, the thickness of the silicon oxide layer is selected in the range from 10 to 2000 nm, preferably in the range from 20 to 1000 nm. This is because in such a range, the steam barrier characteristic and the oxygen barrier characteristic become maximum. The depositing time of silicon oxide ranges from 30 minutes to ten and several hours depending on the depositing conditions thereof such as the concentration of hexafluorosilicic acid, the adding speed of boric acid, the dissolving speed of aluminum, and processing speed.

Thereafter, the transparent composite base, silicon oxide has been formed on both surfaces thereof, is rinsed with water and then dried.

When the transparent conductive substrate is fabricated, before silicon oxide is formed, a coupling agent treatment is preferably performed. In addition, the coupling agent treatment is preferably performed for the transparent compound substrate having the silicon oxide layers. In other words, after the silicon oxide layers are formed, when the coupling agent treatment is performed, the fine pores of the silicon oxide layers are impregnated with the coupling agent. Thus, the mechanical strength of the silicon oxide layers, in particular, the adhesion of the base and the silicon oxide layers, can be improved. The coupling agent and process-method thereof are the same as those for the transparent conductive substrate according to the present invention.

The silicon oxide layers of which coupling agent treatment has been performed in such a method are preferably abraded. When the silicon oxide layers are abraded, the front surfaces of the silicon oxide can be exposed. The abrading method is the same as that for the transparent conductive substrate according to the present invention.

The silicon oxide layers obtained in such a method have excellent optical characteristics, gas barrier characteristic, steam barrier characteristic, adhesion characteristic of the transparent electrode layer and the base, and scratch resisting characteristic. As a result, a transparent conductive substrate with a simple layer structure can be obtained. In the conventional transparent conductive substrate that requires an oxygen barrier layer, a steam barrier layer, a protection layer, and so forth as functional layers and that also requires adhesive agent layers between each base and the transparent electrode layer, the number of steps for the fabrication increases and thereby the structure is complicated. On the other hand, since the transparent conductive substrate according to the present invention does not need such layers, the above-described problems do not take place. In addition, a high temperature heating process that deteriorates the characteristics of the base is not required.

The transparent conductive substrate can be suitably used for various types of display apparatuses. Examples of the display apparatuses are a liquid crystal display apparatus (in particular, an MIM type active matrix type liquid crystal display apparatus), an ECD (electro chromic display), a PDP (plasma display plate), display apparatuses using electrophoresis and magneticphoresis, an ELD (electroluminescence display), and an LED (light emitting diode) that have transparent conductive substrates. These display apparatuses are used for display units of devices that use light and electricity such as small handy information terminal units, information units, wordprocessors, personal computers, workstation, and business units. A modification of the display apparatus according to the present invention is a light adjusting substrate that provides a windshield for house or transporting machine with a light adjusting function.

Next, with reference to the accompanying drawings, the present invention will be practically explained. In part of the drawings, if necessary or simplicity, an anchor coat layer or an adhesive agent layer formed between the transparent heat resisting resin base and a barrier layer or a hard coat layer is omitted.

As shown in FIG. 1, in the transparent conductive substrate according to the present invention, metallic oxide thin film layers are formed on both surfaces of a heat resisting transparent resin base. Thereafter, a silane coupling agent treatment is performed for both the surfaces. A transparent electrode layer 15 is formed on one of the metallic oxide thin film layers 123 and 124 of which the silane coupling agent treatment has been performed. In FIG. 1, since the silane coupling agent treated layer is thin, it is omitted.

Figure 2:
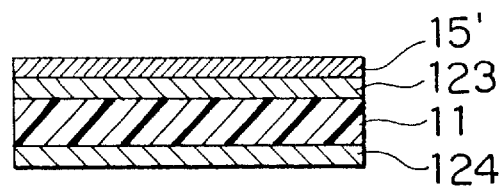
FIG. 2 is a sectional view showing an example of the structure of a transparent conductive substrate having a metallic oxide thin film layer or a metallic nitride thin film layer that is densely composed according to a fabrication method of the present invention.

FIG. 2 shows a structure similar to FIG. 1. In the structure shown in FIG. 2, since there are metallic oxide thin film layers or metallic nitride thin film layers 123 and 124 that are densely formed, the silane coupling agent treatment required in the transparent conductive substrate shown in FIG. 1 is omitted. A transparent electrode layer 15' is formed on one of the metallic oxide thin films or the magnetic nitride thin films 123 and 124.

Figure 9:
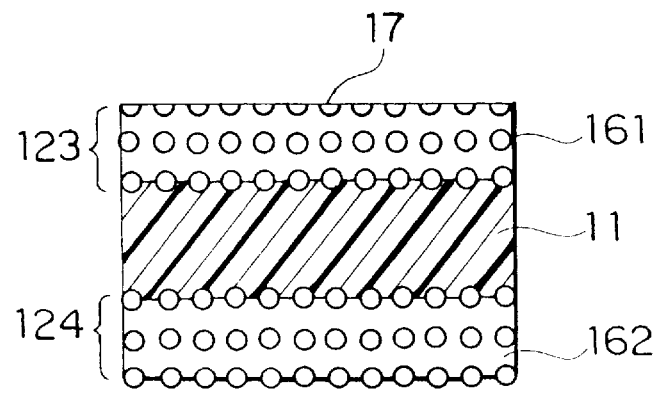
Figure 10:
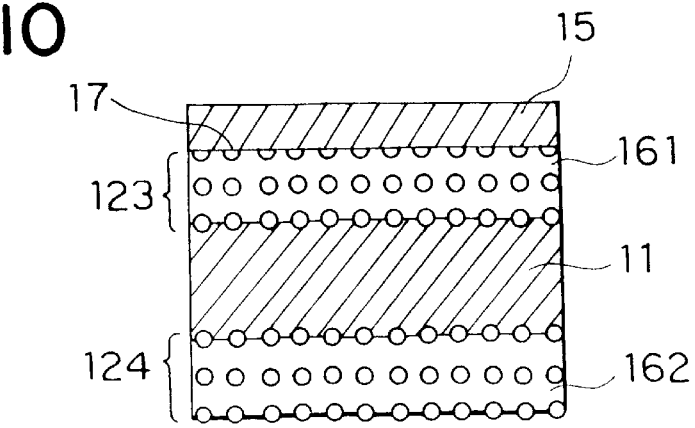

FIGS. 7 to 10 show fabrication steps of the transparent conductive substrate. In the substrate shown in FIG. 1, metallic oxide thin film layers or metallic nitride thin film layers 121 and 122 that are not densely composed are formed on both surfaces of a heat resisting transparent resin base 11. Thereafter, to seal the pore portions of the metallic oxide thin film layers or the metallic nitride thin film layers, the pore portions are impregnated with silane coupling agents 161 and 162. Thus, the metallic oxide thin film layers 121 or the metallic nitride thin film layers 122 are densely and strongly formed. As a result, densely and strongly formed metallic oxide thin film layers or metallic nitride thin film layers 123 and 124 are obtained. Thereafter, as shown in FIG. 9, the front surface of one of the metallic oxide thin film layers or metallic nitride thin film layers 123 that have been densely and strongly formed is abraded so that a smoothly abraded surface 17 of which an organic substance is exposed is obtained. As shown in FIG. 10, a transparent electrode layer 15 is formed on the abraded surface 17.

Figure 11:
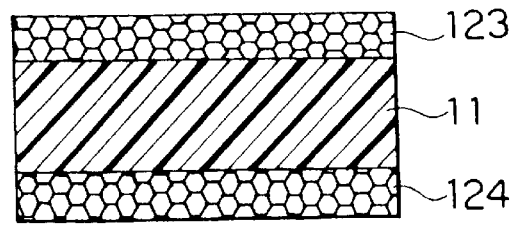
FIGS. 11 and 12 are sectional views showing a part of steps of another fabrication process of a transparent conductive substrate according to the present invention.
Figure 12:
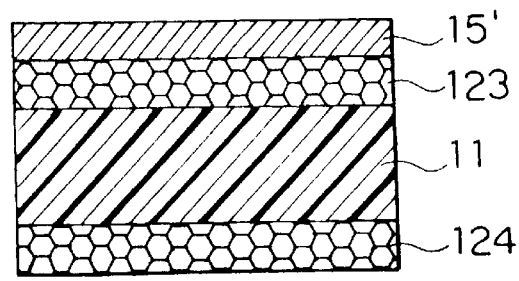

In the fabrication process of the transparent conductive substrate shown in FIG. 2, since the dense metallic oxide layers 123 and 124 are formed on both surfaces of the heat resisting transparent substrate 11 as shown in FIGS. 11 and 12, the transparent electrode 15' can be formed on the dense metallic oxide layer 123 or metallic nitride layer 124 without need to perform the silane coupling agent process. In this case, the silane coupling agent process can be performed.

Figure 3:
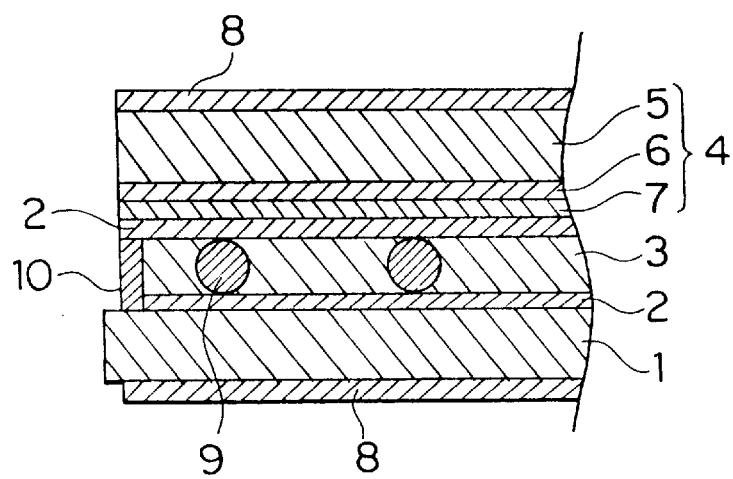
FIG. 3 is a sectional view showing the structure of a liquid crystal display apparatus as an example of a display apparatus according to the present invention.

The transparent conductive substrate according to the present invention can be used for a display apparatus. FIG. 3 is a sectional view showing the structure of a liquid crystal display apparatus to which the transparent conductive substrate according to the present invention is applied. An alignment layer 2 is formed on a transparent conductive substrate 1 with a pattern of electrodes. Thereafter, a rubbing process is performed for the resultant substrate. An opposite substrate 4 is formed sequentially forming a color filter 6 (if necessary) on one surface of a transparent resin substrate 5, a transparent electrode layer 7 on the color filter 6, and an alignment layer 2 on the transparent electrode layer 7. After a spacer 9 is dispersed in the transparent conductive substrate 1, a cell is formed of a seal member 10 along with the transparent conductive substrate 1 and the opposite substrate 4 except for an opening portion to which a liquid crystal material 3 is filled. The cell is filled with the liquid crystal material 3 that becomes a display portion. Thereafter, the opening portion is sealed. By adhering polarizing films 8 to the transparent conductive substrate 1 and the opposite substrate 4, a liquid crystal display apparatus that is an example of the display apparatus according to the present invention is obtained.

Unlike with the conventional transparent conductive substrate, in the transparent conductive substrate according to the present invention, a transparent electrode layer is directly layered on a barrier layer composed of a metallic oxide thin film layer or a metallic nitride thin film layer. In addition, a hard coat layer is substantially composed of a metallic oxide thin film layer or a metallic nitride thin film layer.

As described above, in the conventional metallic oxide thin film layer or metallic nitride thin film layer that are not densely composed, by a silane coupling agent treatment, the layer can be densely and strongly composed. Thus, such differences can be solved by the above-described method for forming the silicon oxide layer.

Figure 4:
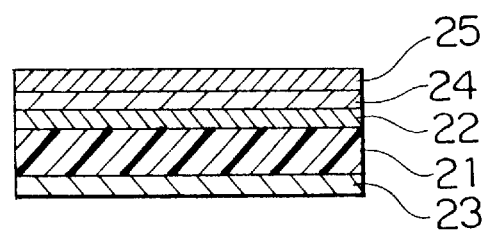
FIGS. 4 to 6 are sectional views showing examples of the structure of a transparent conductive substrate having a transparent heat resisting resin base mainly composed of thermosetting type allylated polyarylene ether.

FIG. 4 shows a structure of layers of a transparent conductive substrate in the case that all the layers are composed of organic substances. A barrier layer 22 is formed on one surface of a heat resisting transparent resin base 21. A transparent electrode layer 25 is formed on the barrier layer 22 through an adhesive agent layer or an anchor coat layer 24. On the opposite surface of the transparent electrode layer 25, a hard coat layer 23 is formed. It should be noted that the barrier layer 22 may be formed between the hard coat layer 23 and the transparent heat resisting resin base 21.

Figure 5:
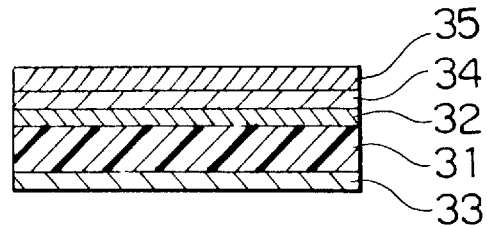

FIG. 5 shows a structure in the case that a metallic oxide thin film layer 32 is formed as a barrier layer on one surface of a heat resisting transparent resin substrate 31. As with the structure shown in FIG. 4, an adhesive agent layer or an anchor coat layer 34, a hard coat layer 33 layer, and a transparent electrode layer 35 are formed in the order.

Figure 6:
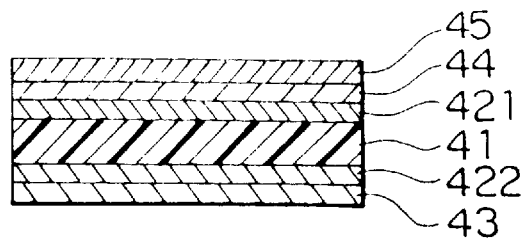
Figure 7:
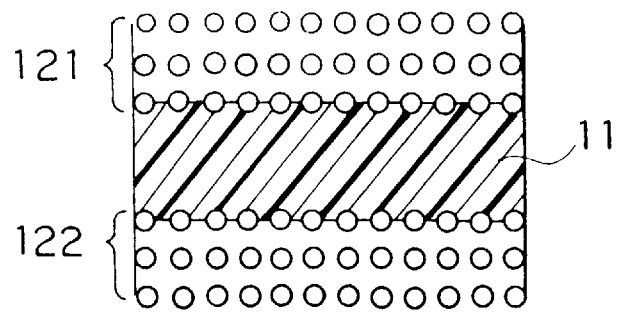
FIGS. 7 to 10 are sectional views showing part of steps of a fabrication process of a transparent conductive substrate according to the present invention.
Figure 8:
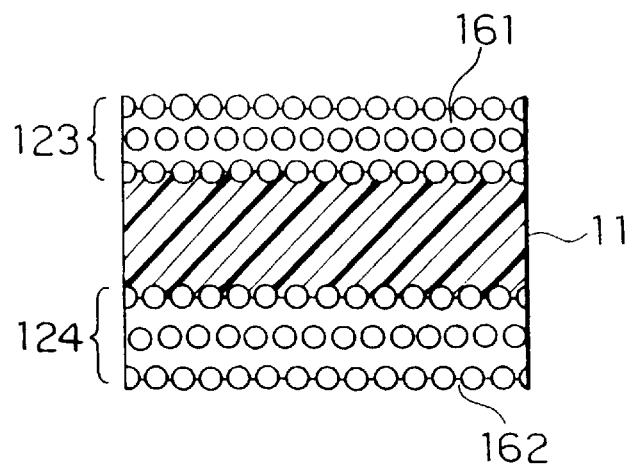

FIG. 6 shows a structure of which metallic oxide thin film layers 421 and 422 as barrier layers are formed on both surfaces of a heat resisting transparent resin base 41. As with the structure shown in FIG. 4, an adhesive agent layer or an anchor coat layer 44, a hard coat layer 43, and a transparent electrode layer 45 are formed in the order.

Figure 13:
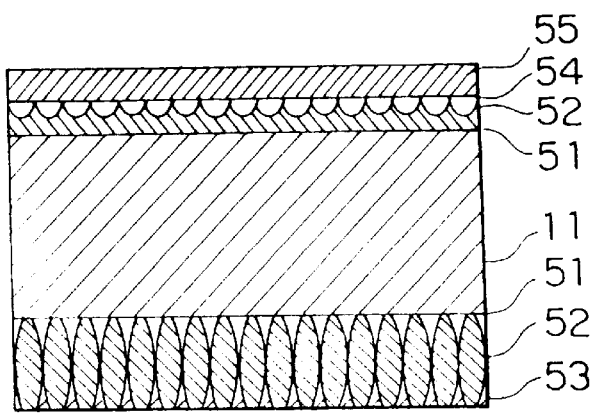
FIG. 13 is a sectional view showing the structure of a transparent conductive substrate having a transparent heat resisting resin base mainly composed of thermosetting type allylated polyarylene ether.
Figure 14:
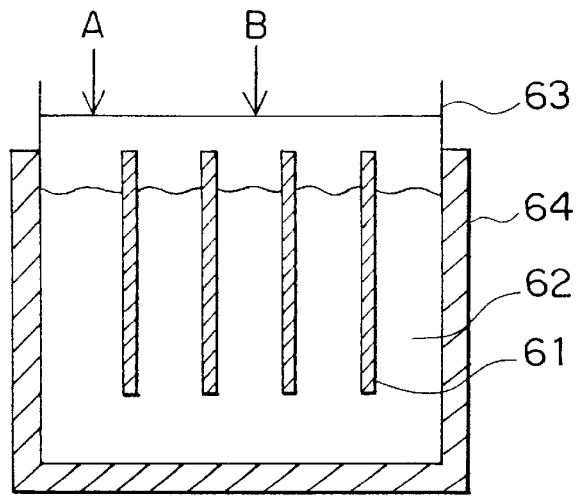
FIG. 14 is a schematic diagram showing a unit for fabricating a silicon oxide layer that partly composes a transparent conductive substrate according to the present invention.
Figure 15:
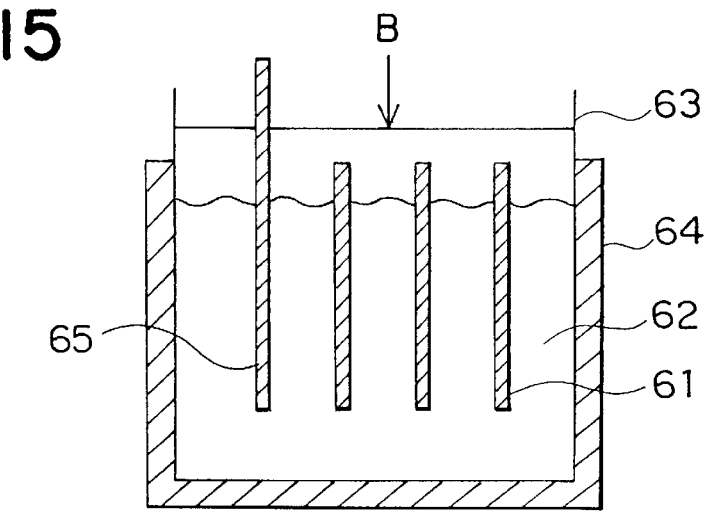
FIG. 15 is a schematic diagram showing another unit for fabricating a silicon oxide layer that partly composes a transparent conductive substrate according to the present invention.

FIG. 13 shows a structure of layers of a transparent conductive substrate having a silicon oxide layer according to the present invention. FIGS. 14 and 15 shows the conception for an apparatus for fabricating a silicon oxide layer according to the present invention. FIG. 14 shows a boric acid adding type apparatus. FIG. 15 shows an aluminum adding type apparatus.

In other words, a heat resisting transparent resin base 11 is rinsed and dried. Both the surfaces are treated with a silane coupling agent 51. On the resultant film, silicon oxide layers 52 are formed. Silane coupling agent layers 53 are formed on the silicon oxide layers 52. Thereafter, one of the silane coupling agent layer 53 is abraded. As a result, an abraded surface 54 is obtained. A transparent electrode layer 55 is formed on the abraded surface 54. As a result, a transparent conductive substrate according to the present invention is obtained.

As shown in FIG. 14, to form the silicon oxide layer, a solution of hexafluorosilicic acid 62 in which silica has been dissolved in supersaturated state is filtered and then filled in a vessel 63. Thereafter, a heat resisting transparent resin base 61 is dipped in the solution in the vessel 63. Boroic acid is continuously added from A. With a hot water tank 64, the temperature of the solution in the vessel 63 is controlled. The solution of hexafluorosilicic acid 62 supersaturated with silica is preferably circulated to B of the vessel 63 through a filter and a pump (not shown). As a result, silicon oxide layers are formed on both surfaces of the heat resisting transparent resin base 61. Letter B represents a return portion of the filtered solution of hexafluorosilicic acid supersaturated with silica.

Likewise, in FIG. 15, instead of adding boric acid, an aluminum plate 65 is dipped in a solution of hexafluorosilicic acid 62 supersaturated with silica. As a result, a silicon oxide layer is formed.

When the process temperature is relatively raised, the additives of boric acid and aluminum plate shown in FIGS. 14 and 15 cannot be always required.

Figure 16:
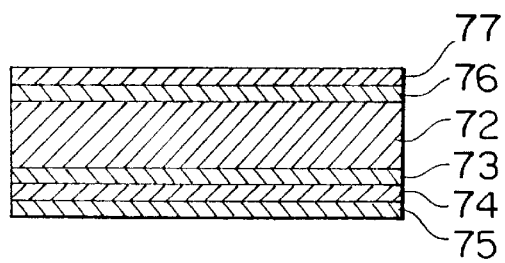
FIGS. 16 and 17 are sectional views showing structures of conventional transparent conductive substrates.
Figure 17:
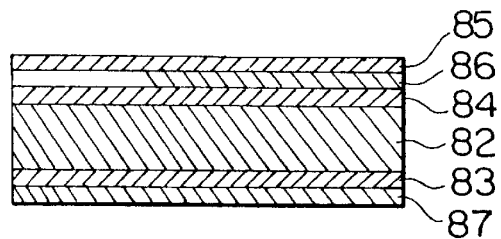

FIGS. 16 and 17 show conventional transparent conductive substrates with bases composed of plastics.

In FIG. 16, on one surface of a transparent resin substrate 72 that becomes a base, an oxygen barrier layer 73 composed of, for example, Evanol that is a copolymer of ethylene and vinylalcohol, nylon resin, or polychlorotrifluoroehylene, a steam barrier layer 74 composed of, for example, polypropylene or polychlorotrifluoroehylene, and a hard coat layer 75 composed of, for example, polyurethane, acrylic resin, or silicone resin are formed. On the other surface of the transparent resin base 72, an anchor layer or adhesive agent layer 76 and a transparent electrode layer 77 are formed through various types of coupling agent layers or acrylic resin layers so as to improve the adhesion to the transparent electrode layer. The oxygen barrier layer 73 and the steam barrier layer 74 can be formed on any of two surfaces of the transparent resin substrate 72. However, when polychlorotrifluoroehylene is used as barrier layers, they are formed between the hard coat layer 75 and the transparent resin substrate 72 opposite to the transparent electrode layer 77. Thus, free halogen ions are prevented from migrating to the display layer.

In the structure of another related art reference shown in FIG. 17, a metallic oxide thin film layer or a metallic nitride thin film layer 84 that functions as an oxygen barrier layer and a steam barrier layer are formed on one surface of a transparent resin base 82. Examples of the metallic oxide thin film layer or the metallic nitride thin film layer 84 are a silicon oxide thin film layer, an aluminum oxide thin film layer, a magnesium oxide thin film layer, and silicon nitride thin film layer. At this point, to improve the adhesion of the metallic oxide thin film layer or the metallic nitride thin film layer 84 and a transparent electrode layer 85 or to protect the metallic oxide thin film layer or the metallic nitride thin film layer 84, a lower layer 86 is formed. A hard coat layer 83 is formed on the other surface of the transparent resin base 82. The hard coat layer 83 is also composed of a metallic oxide thin film layer or a metallic nitride thin film layer. The hard coat layer 83 is protected by a protection layer 87. Since the heat resisting characteristic of the transparent resin base 82 is low, the metallic oxide thin film layers or the metallic nitride thin film layers are formed by a low-temperature and humid liquid phase deposition method, evaporation method of which the substrate temperature is lowered, plasma CVD method, sol-gel method, or the like. Since particles are deposited and the amount of organic group that is separated from a precursor substance is large, the resultant film is not densely composed. Thus, the adhesion to the transparent resin base 82 is insufficient. Thus, the protection layer 87 is required.

Next, the present invention will be described with embodiments and comparison examples.

Embodiment 1

With a resistance heating type vacuum evaporation unit using high purity silicon monoxide as an evaporating substance, under the conditions that the temperature of the evaporating source was around 1300° C. and the temperature of the substrate was around 80° C., silicon oxide thin film layers with a thickness of around 60 nm were formed on both surfaces of a cleaned polyethersulfon base (made by Sumitomo Bakelite Co., Ltd.) with a thickness of 100 $\mu$m. The pore ratio of the thin film layers was around 5 weight % according to a density measurement. The resultant film was dipped in a solution of isopropylalcohol (IPA) containing amino silane coupling agent A1100 (made by Nippon Union Carbide Corporation) of around 1 weight %. After the resultant film was dried with air-drying, it was also dried at 100° C. for 30 minutes. The resultant film was dipped in a solution of IPA containing epoxysilane coupling agent A187 (made by Nippon Union Carbide Corporation) of around 1 weight %. After the resultant film was dried with, it was dried at 110° C. for 30 minutes. Thereafter, the front surface of one silicon oxide thin film layer was lightly abraded by a lap. As a result, the silicon oxide thin film layer was exposed. The exposure of the silicon oxide thin film layer was confirmed by SIMS (secondary ion mass spectrum).

The oxygen barrier characteristic, the steam barrier characteristic, the pencil hardness, and the optical characteristics (light transmittance at 400 nm, haze value at 550 nm, and retardation value at 600 nm) were measured. Table 1 shows the measurement results. In the following Embodiment 2 to Embodiment 12, similar measurements were performed. The measurement results are also shown in Table 1.

The strong adhesion of the silicon oxide thin film layer and polyethersulfon base was confirmed by cellophane tape peel-off tests and infrared spectrum. After the resultant film was cleaned, a transparent conductive layer composed of an ITO film was formed on the abraded surface. The resultant film was patterned by a photoetching method and a chemical etching method. As a result, a transparent electrode layer was formed. Thus, a transparent conductive substrate according to the Embodiment 1 was obtained.

In a series of heat process, dry etching process, and wet etching process, any problem did not take place on the transparent conductive substrate according to the Embodiment 1. In addition, after the transparent conductive substrate was maintained in a high-temperature and high-humidity atmosphere (at 85° C. and at 85% RH) for 1000 hours, any deterioration of properties was not detected.

Embodiment 2

A transparent conductive substrate according to the Embodiment 2 was fabricated in the same manner as the Embodiment 1 except that the silane coupling agent treatment was performed with only a solution of IPA containing acrylic silane coupling agent (made by Nippon Union Carbide Corporation) of around 1 weight %. In this case, the exposure of the silicon oxide thin film layer was confirmed by SIMS. In addition, satisfactory adhesion of the silicon oxide thin film layer was confirmed by a cellophane tape peel-off test.

In a series of heat process, dry etching process, and wet etching process, any problem did not take place on the transparent conductive substrate according to the Embodiment 2. In addition, after the transparent conductive substrate was maintained in a high-temperature and high-humidity atmosphere (at 85° C. and at 85% RH) for 1000 hours, any deterioration of properties was not detected.

Embodiment 3

A transparent conductive substrate according to the Embodiment 3 was fabricated in the same manner as the Embodiment 1 except that the heat resisting transparent resin base was a hardened substance of thermosetting type allylated polyphenylene ether (made by Asahi Chemical Industry Co., Ltd., trade name: A-PPE).

In a series of heat process, dry etching process, and wet etching process, any problem did not take place on the transparent conductive substrate according to the Embodiment 3. In addition, after the transparent conductive substrate was maintained in a high-temperature and high-humidity atmosphere (at 85° C. and at 85% RH) for 1000 hours, any deterioration of properties was not detected.

Embodiment 4

A transparent conductive substrate according to the Embodiment 4 was fabricated in the same manner as the Embodiment 2 except that the heat resisting transparent resin base was a hardened substance of thermosetting type allylated polyphenylene ether (made by Asahi Chemical Industry Co., Ltd., trade name: A-PPE).

In a series of heat process, dry etching process, and wet etching process, any problem did not take place on the transparent conductive substrate according to the Embodiment 4. In addition, after the transparent conductive substrate was maintained in a high-temperature and high-humidity atmosphere (at 85° C. and at 85% RH) for 1000 hours, any deterioration of properties was not detected.

Embodiment 5

High purity aluminum was filled in a high frequency induction heating evaporator housed in a CVD unit. Oxygen gas was supplied to the CVD unit. Aluminum oxide thin film layers with a thickness of around 60 nm were formed on both surfaces of a polyethersulfon base (made by Sumitomo Bakelite Co., Ltd.) with a thickness of 100 $\mu$m. Thereafter, by the silane coupling agent process and the abrading process that are the same as the Embodiment 1, a transparent conductive substrate according to the Embodiment 5 was fabricated. After the abrading process, the exposure of the aluminum oxide layer was confirmed by SIMS.

In a series of heat process, dry etching process, and wet etching process, any problem did not take place on the transparent conductive substrate according to the Embodiment 5. In addition, after the transparent conductive substrate was maintained in a high-temperature and high-humidity atmosphere (at 85° C. and at 85% RH) for 1000 hours, any deterioration of properties was not detected.

Embodiment 6

By an electron beam evaporation method using high purity magnesium monoxide, magnesium oxide thin film layers with a thickness of around 60 nm were formed on both surfaces of a polyethersulfon base (made by Sumitomo Bakelite Co., Ltd.) with a thickness of 100 μm. Thereafter, by the silane coupling agent process and the abrading process that are the same as the Embodiment 1, a transparent conductive substrate according to the Embodiment 6 was fabricated. After the abrading process, the exposure of the magnesium oxide layer was confirmed by SIMS.

In a series of heat process, dry etching process, and wet etching process, any problem did not take place on the transparent conductive substrate according to the Embodiment 6. In addition, after the transparent conductive substrate was maintained in a high-temperature and high-humidity atmosphere (at 85° C. and at 85% RH) for 1000 hours, any deterioration of properties was not detected.

Embodiment 7

As a target material, high purity silicon was used. By a DC magnetron sputtering method using nitrogen and oxygen as supply gases, silicon oxide thin film layers with a thickness of around 60 nm were formed on both surfaces of a polyethersulfon base (made by Sumitomo Bakelite Co., Ltd.) with a thickness of 100 μm. Thereafter, by the silane coupling agent process and the abrading process that are the same as the Embodiment 1, a transparent conductive substrate according to the Embodiment 7 was fabricated. After the abrading process, the exposure of the silicon oxide layer was confirmed by SIMS.

In a series of heat process, dry etching process, and wet etching process, any problem did not take place on the transparent conductive substrate according to the Embodiment 7. In addition, after the transparent conductive substrate was maintained in a high-temperature and high-humidity atmosphere (at 85° C. and at 85% RH) for 1000 hours, any deterioration of properties was not detected.

Embodiment 8

A solution of ethanol of 50 ml containing tetraethoxysilane of 2 g was dropped to a mixture of aqueous ammonia of 10 ml and ethanol of 100 ml. Thereafter, the resultant mixture was stirred for 10 hours at a room temperature. As a result, a sol-solution of $SiO_2$ was obtained. The sol-solution was coated on both surfaces of a polyethersulfon film (made by Sumitomo Bakelite Co., Ltd.) with a thickness of 100 μm and then dried. Thereafter, the resultant film was dried for one hour at 180° C. As a result, a silicon oxide thin film layer with a thickness of around 50 nm was obtained.

Thereafter, the coupling agent treatment for both the surfaces and the abrading process for one surface were performed in the same manner as the Embodiment 1. As a result, a transparent electrode layer was obtained. Thus, a transparent conductive substrate according to the Embodiment 8 was fabricated. After the abrading process, the exposure of the silicon oxide layer was confirmed by SIMS.

In a series of heat process, dry etching process, and wet etching process, any problem did not take place on the transparent conductive substrate according to the Embodiment 8. In addition, after the transparent conductive substrate was maintained in a high-temperature and high-humidity atmosphere (at 85° C. and at 85% RH) for 1000 hours, any deterioration of properties was not detected.

Embodiment 9

An ethanol-water mixture of tetraacetoxysilane of 100 weight parts and hydrochloric acid of one weight part was stirred for one hour at a room temperature. The resultant mixture was coated on both surfaces of a polyethersulfon film (made by Sumitomo Bakelite Co., Ltd.) with a thickness of 100 μm and then dried. Thereafter, the resultant film was dried for one hour at 120° C. As a result, a silicon oxide thin film layer with a thickness of around 50 nm was obtained.

Thereafter, the coupling agent treatment for both the surfaces and the abrading process for one surface were performed in the same manner as the Embodiment 1. As a result, a transparent electrode layer was obtained. Thus, a transparent conductive substrate according to the Embodiment 9 was fabricated. After the abrading process, the exposure of the silicon oxide layer was confirmed by SIMS.

In a series of heat process, dry etching process, and wet etching process, any problem did not take place on the transparent conductive substrate according to Embodiment 9. In addition, after the transparent conductive substrate was maintained in a high-temperature and high-humidity atmosphere (at 85° C. and at 85% RH) for 1000 hours, any deterioration of properties was not detected.

Embodiment 10

Aqueous ammonia of 6M is dropped to a solution of hexahydrate of aluminum chloride of 0.2M. The PH of the resultant solution was around 6.7. After the resultant solution was left for 12 hours at a room temperature, the precipitation was filtered. Thereafter, the resultant solution was fully rinsed with water. Next, acetic acid of 0.15 mol was added to aluminum per 1 mol. The resultant solution was reduced for eight hours at 80° C. As a result, a sol-solution of $Al_2O_3$ was obtained. The sol-solution of $Al_2O_3$ was coated on both surfaces of a polyethersulfon film (made by Sumitomo Bakelite Co., Ltd.) with a thickness of 100 μm and then dried. Thereafter, the resultant film was dried for one hour at 120° C. As a result, an aluminum oxide thin film layer with a thickness of around 50 nm was obtained.

Thereafter, the coupling agent treatment for both the surfaces and the abrading process for one surface were performed in the same manner as the Embodiment 1. Then, a transparent electrode layer was formed. Thus, a transparent conductive substrate according to Embodiment 10 was fabricated. After the abrading process, the exposure of the aluminum oxide layer was confirmed by SIMS.

In a series of heat process, dry etching process, and wet etching process, any problem did not take place on the transparent conductive substrate according to the Embodiment 10. In addition, after the transparent conductive substrate was maintained in a high-temperature and high-humidity atmosphere (at 85° C. and at 85% RH) for 1000 hours, any deterioration of properties was not detected.

Embodiment 11

A mixture of poly (di-t-butoxysiloxane) having repeated components expressed by the following structural formula (average molecular weight: around 10,000) of 100 weight parts, diphenyl silanol of five weight parts, and tris (salicylaldehydate) aluminum of two weight parts was obtained As a result, a mixture of methylisobutylketone (MIBK) was obtained. The resultant solution was coated on both surfaces of a polyethersulfon film (made by Sumitomo Bakelite Co., Ltd.) with a thickness of 100 μm and then dried. Thereafter, the resultant film was dried for one hour at 120° C. As a result, a silicon oxide thin film layer with a thickness of around 60 nm was obtained.

Thereafter, a transparent electrode layer composed of an ITO film was formed on one surface. As a result, a transparent conductive substrate according to Embodiment 11 was fabricated. The exposure of the silicon oxide layer was confirmed by SIMS.

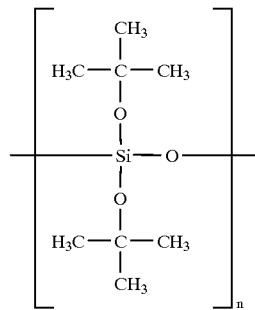

In a series of heat process, dry etching process, and wet etching process, any problem did not take place on the transparent conductive substrate according to the Embodiment 11. In addition, after the transparent conductive substrate was maintained in a high-temperature and high-humidity atmosphere (at 85° C. and at 85% RH) for 1000 hours, any deterioration of properties was not detected.

When tetrachloro silane of 0.1 weight part was used instead of diphynyl silanol and tris (salicylaldehydate) aluminum, the same results were obtained.

Embodiment 12

Poly (methyl phenylsilylene) of five weight parts was dissolved in toluene of 95 weight parts. The resultant solution was coated on both surfaces of a polyethersulfon base (made by Sumitomo Bakelite Co., Ltd.) with a thickness of 100 µm and then dried. Thereafter, the solvent was removed. As a result, a film with a thickness of around 100 nm was obtained. An ultraviolet ray with a wavelength of 254 nm and an output of 30 W/cm$^2$ is radiated to the resultant film for one minute. Thus, poly (methyl phenylsilylene) was optically cured. Thereafter, the film was heated for two hours at 120° C. As a result, a silicon oxide layer was formed.

Thereafter, a transparent electrode layer is formed on one surface in the same manner as the Embodiment 1. As a result, a transparent conductive substrate according to the Embodiment 12 was fabricated. The exposure of the silicon oxide layer was confirmed by SIMS.

In a series of heat process, dry etching process, and wet etching process, any problem did not take place on the transparent conductive substrate according to the Embodiment 12. In addition, after the transparent conductive substrate was maintained in a high-temperature and high-humidity atmosphere (at 85° C. and at 85% RH) for 1000 hours, any deterioration of properties was not detected.

When poly (phenyl hydrosilylene) is used instead of poly (methyl phenylsilylene), the same results were obtained.

Embodiment 13

As a target material, high purity silicon was used. By a DC magnetron sputtering method using ammonia and argon as supply gases, silicon nitride thin film layers with a thickness of around 60 nm were formed on both surfaces of thermosetting type allylated polyphenylene ether (made by Asahi Chemical Industry Co., Ltd., trade name: A-PPE) with a thickness of 100 µm. Thereafter, by the silane coupling agent treatment and the abrading process that are the same as the Embodiment 1, a transparent conductive substrate according to the Embodiment 13 was fabricated. After the abrading process, the exposure of the silicon nitride layer was confirmed by SIMS.

In a series of heat process, dry etching process, and wet etching process, any problem did not take place on the transparent conductive substrate according to the Embodiment 13. In addition, after the transparent conductive substrate was maintained in a high-temperature and high-humidity atmosphere (at 85° C. and at 85% RH) for 1000 hours, any deterioration of properties was not detected.

Table 1 shows the oxygen barrier characteristic, the steam barrier characteristic, the pencil hardness, and the optical characteristics (light transmittance at 400 nm, haze value at 550 nm, and retardation value at 600 nm) of the transparent composite base in which the transparent electrode of the transparent conductive substrate according to the Embodiment 1 to Embodiment 12 has not been formed. The measurement method of the haze value corresponds to JIS K 7105 standard.

TABLE 1

| | Characteristics | | | | | |
|---|---|---|---|---|---|---|
| Embodiment | Oxygen barrier resisting characteristic (cc/m$^2$ · 24 Hr · atm) | Steam barrier resisting characteristic (g/m$^2$ · 24 Hr) | Pencil hardness | Light transmittance (%) | Haze (%) | Retardation (nm) |
| 1  | 0.10 | 0.13 | 5H | 89 | 0.5 | 10 |
| 2  | 0.11 | 0.15 | 5H | 89 | 0.5 | 10 |
| 3  | 0.10 | 0.16 | 5H | 90 | 0.5 | 8  |
| 4  | 0.11 | 0.15 | 5H | 90 | 0.5 | 8  |
| 5  | 0.20 | 0.23 | 5H | 85 | 0.6 | 20 |
| 6  | 0.12 | 0.19 | 5H | 83 | 0.8 | 20 |
| 7  | 0.21 | 0.25 | 4H | 82 | 0.9 | 20 |
| 8  | 0.22 | 0.28 | 4H | 87 | 0.7 | 15 |
| 9  | 0.23 | 0.27 | 4H | 87 | 0.8 | 15 |
| 10 | 0.24 | 0.29 | 4H | 88 | 0.7 | 15 |
| 11 | 0.11 | 0.16 | 5H | 90 | 0.5 | 10 |
| 12 | 0.25 | 0.30 | 3H | 87 | 0.8 | 20 |

As is clear from Table 1, the transparent composite base according to the present invention has excellent oxygen barrier characteristic, steam barrier characteristic, pencil hardness, light transmittance, haze value, and retardation value. In addition, the transparent composite base has excellent adhesion to the transparent electrode layer. The transparent composite base is unified as a substrate. As a result, a transparent conductive substrate with an excellent heating resisting characteristic along with the above-described characteristics was obtained.

When thermosetting type allylated polyphenylene ether is used for the heat resisting transparent resin base (according to the Embodiment 3 and Embodiment 4), the barrier characteristics and scratch resisting characteristic are the same as those of the other embodiments. In addition, optical characteristics (especially, the retardation value) are remarkably low. Since other heat resisting transparent resin bases are fabricated by a extrusion method, the resins are aligned in the fabrication process. On the other hand, since thermosetting type allylated polyarylene ether is formed by a casting method, the resins are not aligned in the fabrication process. Thus, optical anisotropy does not take place.

Comparison Example 1

A coupling agent treatment using amino silane coupling agent or epoxy silane coupling agent was performed for a silicon oxide thin film layer in the same manner as the Embodiment 1. A transparent conductive layer was formed without an abrading process using a lap. When the resultant transparent conductive substrate was maintained in a high-temperature and high-humidity atmosphere (at 85° C. and at 85%RH) for 1000 hours, the transparent electrode layer was cracked.

Comparison Example 2

After an ITO film of FST-5337 (trade name of Sumitomo Bakelite Co., Ltd.) that is a transparent conductive substrate with a polyethersulfone base was removed, a wiring metal layer was formed on the base so as to fabricate an active matrix type liquid crystal display apparatus. However, in this process, the metal layer cannot be equally formed.

Since an organic barrier layer and an adhesive agent layer with a low heat resisting characteristic were used, it seems that they melted and shrank in the heat process and thereby the transparent base as the substrate was largely thermally-deformed.

The pencil hardness of the surface on which the transparent electrode of the transparent conductive substrate was not formed was 2H.

Comparison Example 3

A silicon oxide thin film layer was formed on one surface of the polyethersulfon base in the same manner as the Embodiment 1. A polymethyl acrylate type adhesive agent with a thickness of 10 $\mu$m was applied to the resultant surface. On the opposite surface of the polyethersulfon base, epoxy modified acrylic resin with a thickness of 10 $\mu$m was coated as a protection layer and then hardened.

Thereafter, a transparent electrode layer was formed in the same manner as the Embodiment 1. However, the transparent electrode layer was not equally formed.

Since an organic adhesive agent layer and an organic protection layer with lower heat resisting characteristics were used, it seems that they melted and shrank in the heat process and thereby the transparent base as the substrate was largely thermally-deformed The pencil hardness of the surface on which the transparent electrode of the transparent conductive substrate was not formed was 3H.

Comparison Example 4

Silicon oxide thin film layers were formed on both surfaces of a polyethersulfon base in the same manner as the Embodiment 1. A polymethyl acrylate group adhesive agent with a thickness of 10 $\mu$m was applied to one silicon oxide thin film layer. Epoxy modified acrylic resin with a thickness of 10 am was coated as a protection layer on the other silicon oxide thin film layer and then hardened.

Thereafter, a transparent electrode layer was formed in the same manner as the Embodiment 1. However, the transparent electrode layer was not equally formed.

Since an organic adhesive agent layer and an organic protection layer with low heat resisting characteristics were used, it seems that they melted and shrank in the heat process and thereby the transparent base as the substrate was largely thermally-deformed.

The pencil hardness of the surface on which the transparent electrode of the transparent conductive substrate was not formed was 3H.

Embodiment 14

As shown in FIG. 3, a display apparatus having a transparent conductive substrate according to the present invention was fabricated. A solution of dissolvable polyimide was coated on a transparent conductive substrate 1 according to the Embodiment 1, the substrate having the transparent electrode layer, an active portion, and a wiring portion. Thereafter, the solution was dried and an alignment layer 2 was formed. Next, a rubbing process was performed for the alignment layer 2. Next, a seal was printed. After a spacer 9 was dispersed, an opposite substrate 4 composed of a transparent resin base 5, an alignment layer 2, and so forth was assembled. Thereafter, a liquid crystal material 3 was filled in the substrates and then temporarily sealed. Next, the resultant substrates were sealed. By a rinsing process and an alignment annealing process, a liquid crystal cell was fabricated. Last, by disposing a polarizing film 8 on the liquid crystal cell, an active matrix type liquid crystal display apparatus was obtained.

The weight of the resultant liquid crystal module according to the present invention is around 20% of the weight of the conventional module of which a transparent electrode is formed on a glass substrate with a thickness of 0.7 mm. Thus, the weight was remarkably reduced.

Embodiment 15

A solution of a hydrolysis substance of tetraethoxysilane (made by Chisso Corporation, CSGL-0803P) was diluted with IPA. The resultant solution was coated on a thermosetting type allylated polyphenylene ether (made by Asahi Chemical Industry Co., Ltd., trade name: A-PPE) with a thickness of 100 $\mu$m that had been cleaned. The resultant film was dried for 30 minutes at 110° C. Thus, a film with a thickness of 3 nm was obtained.

Thereafter, as shown in FIG. 14, industrial silica gel was dissolved in a solution of hexafluorosilicic acid with a concentration of 2 mols/l at −3° C. The resultant solution was filtered. The resultant solution was heated in a hot water tank at 35° C. The thermosetting type allylated polyphenylene ether base that had been treated with the hydrolysis substance of tetraethoxysilane was dipped in the solution in the tank. Thereafter, a solution of boric acid of with a concentration of 0.5 mols/l was poured to the tank at a speed of 0.2 ml/min. The solution was filtered by a filter with a hole diameter of 1.5 $\mu$m. Eight weight % of the entire solution were circulated per minute. Three hours later, the thermosetting type allylated polyarylene ether was removed from the tank and rinsed with water and then dried. The thickness of the silicon oxide layer was around 50 nm. An IPA solution of $\gamma$-methacryloxypropyltrimethoxysilane was coated on the silicon oxide layer. The resultant film was dried for 30 minutes at 100° C. Thus, a film with a thickness of around 5 nm was formed. One process layer was lightly abraded by a lap. After the abrading process, the exposure of the silicon oxide layer was confirmed by SIMS.

The oxygen barrier characteristic, the steam barrier characteristic, the pencil hardness, and the optical characteristics (light transmittance at 400 nm, haze value at 550 nm, and retardation value at 600 nm) of the obtained transparent composite base were measured. The measurement results are shown in Table 2.

The strong adhesion of the abraded silicon oxide layer and the thermosetting type allylated polyphenylene ether base was confirmed by a cellophane tape peel-off test.

The same measurements were performed for the following Embodiment 16 to Embodiment 24. The results are shown in Table 2.

After the transparent composite base was cleaned, a transparent conductive layer composed of an ITO film or the like was formed on the abraded surface. The transparent conductive layer was patterned by a photosetting method and a chemical etching method. As a result, a transparent electrode layer was obtained. Thus, a transparent conductive substrate according to the Embodiment 15 was fabricated.

In a series of heat process, dry etching process, and wet etching process, any problem did not take place on the transparent conductive substrate according to the Embodiment 15. In addition, after the transparent conductive substrate was maintained in a high-temperature and high-humidity atmosphere (at 85° C. and at 85% RH) for 1000 hours, any deterioration of properties was not detected.

Embodiment 16

A transparent conductive substrate was fabricated in the same manner as the Embodiment 15 except that boric acid was not added to the solution and an aluminum plate 65 was dipped in the tank as shown in FIG. 15. After an abrading process, the exposure of a silicon oxide layer was confirmed by SIMS.

The strong adhesion of the abraded silicon oxide layer and the thermosetting type allylated polyphenylene ether base was confirmed by a cellophane tape peel-off test.

In a series of heat process, dry etching process, and wet etching process, any problem did not take place on the transparent conductive substrate according to the Embodiment 16. In addition, after the transparent conductive substrate was maintained in a high-temperature and high-humidity atmosphere (at 85° C. and at 85% RH) for 1000 hours, any deterioration of properties was not detected.

Embodiment 17

A transparent conductive substrate was fabricated in the same manner as the Embodiment 15 except that boric acid was not added to the solution, an aluminum plate was not dipped, the treating temperature was 60° C., and the time was one hour. After an abrading process, the exposure of a silicon oxide layer was confirmed by SIMS.

The strong adhesion of the abraded silicon oxide layer and the thermosetting type allylated polyphenylene ether base was confirmed by a cellophane tape peel-off test. In a series of heat process, dry etching process, and wet etching process, any problem did not take place on the transparent conductive substrate according to the Embodiment 17. In addition, after the transparent conductive substrate was maintained in a high-temperature and high-humidity atmosphere (at 85° C. and at 85% RH) for 1000 hours, any deterioration of properties was not detected.

Embodiment 18

A transparent conductive substrate was fabricated in the same manner as the Embodiment 17 except that the silicon oxide layer was processed with γ-aminopropylethoxysilane instead of γ-methacryloxypropyltrimethoxysilane and then dried with γ-glycidoxypropyltrimethoxysilane, and a treated layer was formed using the reaction of amino group and epoxy group. After an abrading process, the exposure of the silicon oxide layer was confirmed by SIMS.

The strong adhesion of the abraded silicon oxide layer and the thermosetting type allylated polyphenylene ether base was confirmed by a cellophane tape peel-off test. In a series of heat process, dry etching process, and wet etching process, any problem did not take place on the transparent conductive substrate according to the Embodiment 18. In addition, after the transparent conductive substrate was maintained in a high-temperature and high-humidity atmosphere (at 85° C. and at 85% RH) for 1000 hours, any deterioration of properties was not detected.

Embodiment 19

A transparent conductive substrate was fabricated in the same manner as the Embodiment 14 except that the heat resisting transparent resin base was a polyethersulfon base (made by Sumitomo Bakelite Co., Ltd.) with a thickness of 100 μm instead of the thermosetting type allylated polyphenylene ether base. After an abrading process, the exposure of a silicon oxide thin film layer was confirmed by SIMS.

The strong adhesion of the abraded silicon oxide layer and the polyethersulfon base was confirmed by a cellophane tape peel-off test. In a series of heat process, dry etching process, and wet etching process, any problem did not take place on the transparent conductive substrate according to the Embodiment 19. In addition, after the transparent conductive substrate was maintained in a high-temperature and high-humidity atmosphere (at 85° C. and at 85% RH) for 1000 hours, any deterioration of properties was not detected.

Embodiment 20

A transparent conductive substrate was fabricated in the same manner as the Embodiment 16 except that the heat resisting transparent resin base was a polyethersulfon base (made by Sumitomo Bakelite Co., Ltd.) with a thickness of 100 μm instead of the thermosetting type allylated polyphenylene ether base. After an abrading process, the exposure of a silicon oxide thin film layer was confirmed by SIMS.

The strong adhesion of the abraded silicon oxide layer and the polyethersulfon base was confirmed by a cellophane tape peel-off test. In a series of heat process, dry etching process, and wet etching process, any problem did not take place on the transparent conductive substrate according to the Embodiment 20. In addition, after the transparent conductive substrate was maintained in a high-temperature and high-humidity atmosphere (at 85° C. and at 85% RH) for 1000. hours, any deterioration of properties was not detected.

Embodiment 21

A transparent conductive substrate was fabricated in the same manner as the Embodiment 15 except that the heat resisting transparent resin was a polyarylate base (made by Kaneka Corporation) with a thickness of 100 μm instead of the thermosetting type allylated polyphenylene ether base. After an abrading process, the exposure of a silicon oxide layer was confirmed by SIMS.

The strong adhesion of the abraded silicon oxide layer and the polyarylate base was confirmed by a cellophane tape peel-off test. In a series of heat process, dry etching process, and wet etching process, any problem did not take place on the transparent conductive substrate according to the Embodiment 21. In addition, after the transparent conductive substrate was maintained in a high-temperature and high-humidity atmosphere (at 85° C. and at 85% RH) for 1000 hours, any deterioration of properties was not detected.

Embodiment 22

A transparent conductive substrate was fabricated in the same manner as the Embodiment 16 except that the heat resisting transparent resin was a polyarylate base (made by Kaneka Corporation) with a thickness of 100 μm instead of the thermosetting type allylated polyphenylene ether base. After an abrading process, the exposure of a silicon oxide thin film layer was confirmed by SIMS.

The strong adhesion of the abraded silicon oxide layer and the polyarylate base was confirmed by a cellophane tape peel-off test. In a series of heat process, dry etching process, and wet etching process, any problem did not take place on the transparent conductive substrate according to the embodiment 22. In addition, after the transparent conductive substrate was maintained in a high-temperature and high-humidity atmosphere (at 85° C. and at 85% RH) for 1000 hours, any deterioration of properties was not detected.

Embodiment 23

A transparent conductive substrate was fabricated in the same manner as the Embodiment 15 except that the heat resisting transparent resin was a polycarbonate base (made by Mitsubishi Gas Chemical Co., Inc.) with a thickness of 100 μm instead of the thermosetting type allylated polyphenylene ether base. After an abrading process, the exposure of a silicon oxide layer was confirmed by SIMS.

The strong adhesion of the abraded silicon oxide layer and the polycabonate base was confirmed by a cellophane tape peel-off test. In a series of heat process, dry etching process, and wet etching process, any problem did not take place on the transparent conductive substrate according to the Embodiment 23. In addition, after the transparent conductive substrate was maintained in a high-temperature and high-humidity atmosphere (at 85° C. and at 85% RH) for 1000 hours, any deterioration of properties was not detected.

Embodiment 24

A transparent conductive substrate was fabricated in the same manner as the Embodiment 16 except that the heat resisting transparent resin was a polycarbonate base (made by Mitsubishi Gas Chemical Co., Inc.) with a thickness of 100 μm instead of the thermosetting type allylated polyphenylene ether base. After an abrading process, the exposure of a silicon oxide layer was confirmed by SIMS.

The strong adhesion of the abraded silicon oxide layer and the polycarbonate base was confirmed by a cellophane tape peel-off test. In a series of heat process, dry etching process, and wet etching process, any problem did not take place on the transparent conductive substrate according to the Embodiment 24. In addition, after the transparent conductive substrate was maintained in a high-temperature and high-humidity atmosphere (at 85° C. and at 85% RH) for 1000 hours, any deterioration of properties was not detected.

Table 2 shows the oxygen barrier characteristic, the steam barrier characteristic, the pencil hardness, and the optical characteristics (light transmittance at 400 nm, haze value at 550 nm, and retardation value at 600 nm) of the transparent composite base in which the transparent electrode according to the Embodiment 15 to Embodiment 24 has not been formed. The measurement method of the haze value corresponds to JIS K 7105 standard.

TABLE 2

| Embodiment | Characteristics | | | | | |
|---|---|---|---|---|---|---|
| | Oxygen barrier resisting characteristic ($cc/m^2 \cdot 24$ Hr $\cdot$ atm) | Steam barrier resisting characteristic ($g/m^2 \cdot 24$ Hr) | Pencil hardness | Light transmittance (%) | Haze (%) | Retardation (nm) |
| 15 | 0.11 | 0.15 | 5H | 90 | 0.5 | 8 |
| 16 | 0.10 | 0.14 | 5H | 89 | 0.5 | 9 |
| 17 | 0.11 | 0.15 | 5H | 90 | 0.5 | 8 |
| 18 | 0.11 | 0.15 | 5H | 88 | 0.5 | 9 |
| 19 | 0.10 | 0.16 | 5H | 90 | 0.5 | 15 |
| 20 | 0.10 | 0.16 | 5H | 90 | 0.5 | 14 |
| 21 | 0.10 | 0.16 | 4H | 90 | 0.5 | 10 |
| 22 | 0.10 | 0.17 | 4H | 89 | 0.5 | 11 |
| 23 | 0.10 | 0.15 | 6H | 90 | 0.5 | 12 |
| 24 | 0.10 | 0.17 | 6H | 89 | 0.5 | 13 |

As is clear from Table 2, the transparent composite base of which both surfaces of the heat resisting transparent resin base is treated with silicon oxide layers, the resultant surfaces are processed with silane coupling agent, and one surface is abraded by a lap has excellent optical characteristics, scratch resisting characteristic, oxygen barrier characteristic, and steam barrier characteristic as well as an excellent heat resisting characteristic. In addition, the transparent conductive substrate of which a transparent electrode layer is formed on an abraded surface has an excellent heat resisting characteristic, optical characteristics, scratch resisting characteristic, oxygen barrier characteristic, and steam barrier characteristic.

As a reason why the transparent conductive substrate with a thermosetting type allylated polyphenylene ether has excellent optical characteristics, the resin is amorphous and is formed by a casting method. Thus, the base is in non-alignment state.

The shock resisting characteristic of the transparent conductive substrate according to the Embodiment 15 was compared with a conventional transparent conductive substrate with a polyethersulfon base (made by Sumitomo Bakelite Co., Ltd., trade name: FST-5337). As the measurement method, a steel ball with a diameter of 11 mmφ and a weight of 4.5 g was naturally dropped to test pieces. The falling height of which 50% of test pieces were destroyed or test pieces became cloudy due to occurrence of micro-cracks was measured. Table 3 shows the measurement results and thermally deforming temperature of the transparent conductive substrate

TABLE 3

| Transparent conductive substrate | Shock resisting characteristic | | Thermally deforming temperature (°C.) |
|---|---|---|---|
| | Falling height (cm) | Situation of destruction | |
| Embodiment 15 | 25 | Micro-cracks (becoming cloudy) | 197 |
| Conventional substrate 1 | 20 | Micro-cracks (becoming cloudy) | 175 |
| Conventional substrate 2 | 15 | Destructing - floating | — |

Note)
Conventional substrate 1: Conventional plastic substrate with PES film base
Conventional substrate 2: Conventional glass substrate As is clear from Table 3, the transparent conductive substrate according to the present invention much higher shock resisting characteristic than that of the glass substrate In addition, the transparent conductive substrate according to the present invention has a higher shock resisting characteristic than that of a conventional transparent conductive substrate with a polyethersulfon base. The thermally deforming temperature of the transparent conductive substrate of the present invention is higher than that of the conventional transparent conductive substrates. Since the transparent conductive substrate is composed of a material with a lower heat resisting characteristic than that of the base, the thermally deforming temperature of the transparent conductive substrate is lower than that of the base.

Comparison Example 5

After a polyethersulfon base was rinsed, it was treated with a hydrolysis substance of tetraethoxy silane. To form a silicon oxide layer on the base by a CVD method, the heat resisting characteristic of the polyethersulfon base was examined. In the conventional CVD method, at 430° C. or higher temperature, while silane gas, oxygen gas, and nitrogen gas are being supplied, the silicon oxide layer is formed. The high temperature film forming process is required to compose a dense, transparent, and conductive silicon oxide layer. However, the results of experiments conducted by the inventors of the present invention show that the heat resisting characteristic of the polyethersulfon substrate is low and thereby thermally deformed at around 190° C. Thus, the silicon oxide layer was not formed on the polyethersulfon.

Embodiment 25

A solution of xylene containing polysilazane (made by Tonen Corporation, trade name: Tonen Polysilazane) (low temperature baked grade), model N-L110) of 20 weight % was diluted into 10% concentration by xylene. The resultant solution was coated on both surfaces of a thermosetting type allylated phlyphenylene ether (made by Asahi Chemical Industry Co., Ltd., trade name: A-PPE) with a thickness of 100 μm by a wire bar. The resultant film was dried at 100° C. As a result, a polysilazane layer with a thickness of around 1 μm was formed. The resultant film was exposed to an ozone atmosphere with a concentration of 50 ppm for 30 minutes. The resultant thermosetting type allylated polyphenylene ether was baked for 2 hours at 150° C. As a result, a transparent composite base composed of a thermosetting type allylated polyphenylene ether/silicon oxide thin film layer was fabricated. It was confirmed that the silicon oxide was $SiO_2$ by SIMS.

The oxygen barrier characteristic, the steam barrier characteristic, the pencil hardness, and the optical characteristics (light transmittance at 400 nm, haze value at 550 nm, and retardation value at 600 nm) of the obtained transparent composite base were measured. Table 4 shows the results. The similar measurements were performed for Embodiment 27 and Embodiment 28, Comparison Example 8, and Comparison Example 9. The results of these embodiments and comparison examples are also shown in Table 4. The result of a cellophane tape peel-off test was 100/100 (not-peeled regions/100 regions).

An MIM type transparent electrode layer (Ta, TaOx, Ti, and ITO formed on the silicon oxide thin film layer in the order) was formed on one surface of the transparent composite base by a sputtering method, a photo etching method, a chemical etching method, an anode oxidizing method, and so forth. As a result, a transparent conductive substrate [I] was fabricated.

In addition, a transparent conductive substrate [II] with a base composed of a hardened substance of thermosetting type allylated polyphenylene ether was fabricated in the same manner as described above except that an ITO electrode layer was simply formed as a transparent electrode layer.

In a series of heat process, dry etching process, and wet etching process, any problem did not take place on the transparent conductive substrate according to the Embodiment 25. In addition, after the transparent conductive substrate was maintained in a high-temperature and high-humidity atmosphere (at 85° C. and at 85% RH) for 1000 hours, any deterioration of properties was not detected.

Embodiment 26

A dissolvable polyimide film was formed on the transparent electrode layer of the transparent conductive substrate [I] of the Embodiment 25 by a printing method. The resultant film was baked at 180° C. A rubbing process was performed for the resultant film. As a result, an alignment layer was formed. The alignment layer was used as an electrode substrate.

In addition, a color filter layer was formed on the opposite surface of the transparent conductive substrate of which the transparent electrode layer is not formed. A pattern electrode layer composed of ITO was formed on the color filter layer. A dissolvable polyimide film was formed on the pattern electrode layer by a printing method. A rubbing process was performed for the dissolvable polyimide film. As a result, an opposite electrode substrate was formed.

Thereafter, an epoxy resin for assembling a cell was formed by a seal printing method. The resultant film was baked at 180° C. After an orientation layer was formed, a spacer was dispersed. The cell composed of the transparent electrode substrate and the opposite substrate was sealed. A liquid crystal material was filled in the cell from an opening portion. The opening portion was sealed. The resultant cell was connected to an external drive circuit. As a result, a liquid crystal display apparatus was fabricated.

The weight of the resultant display apparatus was 20% of that of the conventional display apparatus having a glass substrate (with a thickness of 0.7 mm). Thus, the weight of the display apparatus was remarkably reduced. In each step of the fabrication of the display apparatus according to the Embodiment 25 and Embodiment 26, any trouble did not take place.

Embodiment 27

A silicon oxide thin film layer was formed on a thermosetting type allylated polyarylene ether film in the same manner as the Embodiment 25 except that the dried film of polysilazane (made by Tonen Corporation, trade name: Tonen polysilazane (low temperature baked grade, model N-L110) was dipped in a solution of hydrogen peroxide of 35 weight % for five hours, not exposed to an ozone atmosphere. The result of a cellophane tape peel-off test was 100/100 (not-peeled regions/100 regions). An ITO film was directly formed on the silicon oxide thin film layer. As a result, a transparent conductive substrate was fabricated. It was confirmed that the silicon oxide was $SiO_2$ by SIMS.

In a series of heat process, dry etching process, and wet etching process, any problem did not take place on the transparent conductive substrate according to the Embodiment 27. In addition, after the transparent conductive substrate was maintained in a high-temperature and high-humidity atmosphere (at 85° C. and at 85% RH) for 1000 hours, any deterioration of properties was not detected.

Embodiment 28

A silicon oxide thin film layer was formed on a thermosetting type allylated polyarylene ether film in the same manner as the Embodiment 25 except that the dried film of polysilazane (made by Tonen Corporation, trade name: Tonen polysilazane (low temperature baked grade, model N-L110) was exposed to a high temperature and high humidity atmosphere (at 90° C. and at 90% RH) for five hours, not exposed to an ozone atmosphere. The result of a cellophane tape peel-off test was 100/100 (not-peeled regions/100 regions). An ITO film was directly formed on the silicon oxide thin film layer. As a result, a transparent conductive substrate was fabricated. It was confirmed that the silicon oxide was $SiO_2$ by SIMS.

In a series of heat process, dry etching process, and wet etching process, any problem did not take place on the transparent conductive substrate according to the Embodiment 28. In addition, after the transparent conductive substrate was maintained in a high-temperature and high-humidity atmosphere (at 85° C. and at 85% RH) for 1000 hours, any deterioration of properties was not detected.

Comparison Example 6

A solution of xylene of containing polysilazane (made by Tonen Corporation, trade name: Tonen Polysilazane (low temperature baked grade), model N-L110) of 20 weight % was coated on a silicon wafer with a thickness of 100 μm by a spin coat method. The resultant film was dried for 30 minutes at 100° C. As a result, a polysilazane layer with a thickness of around 0.6 μm was formed. The dried polysilazane layer was loaded in a heat air furnace at a temperature of 250° C. The film was periodically observed by infrared spectrum and SIMS. The observation results show that the complete conversion from the dried polysilazane film to $SiO_2$ takes three to four hours as a heat process time.

However, this high temperature process at 250° C., is undesirable for a transparent heat resisting resin base in spite of this relative short heat process time.

Comparison Example 7

A polysilazane (made by Tonen Corporation, trade name: Tonen Polysilazane (low temperature baked grade), model N-L110) film was formed on a silicon wafer. While a heat process was being performed for the resultant film at 150° C., it was periodically observed by infrared ray spectrum and SIMS. Observation results show that the complete conversion from the dried polysilazane film to $SiO_2$ takes around 20 hours as a heat process time. Such a long heat process time results in a remarkable increase of the fabrication cost of the transparent conductive substrate.

Comparison Example 8

A transparent conductive substrate with an ITO film base composed of a polyethersulfon film (made by Sumitomo Bakelite Co., Ltd.) with a thickness of 100 μm was processed with hydrochloric acid and thereby the ITO film was removed. In this state, the result of the cellophane tape peel-off test was 100/100 (not-peeled regions/100 regions).

When an alignment layer was formed on the transparent conductive substrate with a base composed of a polyethersulfon film in the same manner as the Embodiment 25, the resultant substrate was largely curled. In addition, the surface roughness of the hard coat was large.

Comparison Example 9

SiO as an evaporation source was evaporated on both surfaces of a polyethersulfon film (made by Mitsui Toatsu Chemicals Inc., trade name: TALPA 1000) with a thickness of 100 μm (substrate temperature: 70° C.). As a result, a silica layer ($SiO_{1.6}$) with a thickness of 30 nm was obtained. In the state, the result of the cellophane tape peel-off test was 100/100 (not-peeled regions/100 regions). γ-methacryloxypropyltrimethoxysilane dissolved in IPA was coated on the silica layer. As a result, a protection layer with a thickness of around 10 nm was formed. An MIM type transparent electrode layer was formed in the same manner as the Embodiment 25. As a result, a transparent conductive substrate was fabricated. Although an alignment layer was attempted to be formed on the transparent conductive substrate in the same manner as the Embodiment 26, the resultant substrate was largely curled.

Comparison Example 10

An MIM type transparent electrode layer was attempted to be formed on a transparent conductive substrate with a polycarbonate base (made by Fujimori Kogyo Co., Ltd., trade name: AMOREX 1000) in the same manner as the Embodiment 25, the resultant film was largely curled. As a result, the transparent electrode base was not formed.

Table 4 shows evaluation results of the characteristics of composite bases of five types of transparent conductive substrates except for the AMOREX film. The evaluations were performed in the same conditions as the Embodiment 1. The oxygen permeability and steam permeability in the table represent values of which the thickness of test pieces is not compensated.

TABLE 4

| Embodiment/ comparison example | Characteristics | | | | | |
|---|---|---|---|---|---|---|
| | Oxygen barrier resisting characteristic ($cc/m^2 \cdot 24$ $Hr \cdot atm$) | Steam barrier characteristic ($g/m^2 \cdot 24\ Hr$) | Pencil hardness | Light transmittance (%) | Haze (%) | Retardation (nm) |
| Embodiment 25 | 0.2 | 0.1 | 5H | 90 | 0.5 | 10 |
| Embodiment 27 | 0.3 | 0.1 | 5H | 90 | 0.7 | 12 |
| Embodiment 28 | 0.3 | 0.1 | 5H | 90 | 0.5 | 11 |
| Comparison Example 8 | 0.4 | 1.3 | 2H | 85 | 1.0 | 2 |
| Comparison Example 9 | 0.6 | 1.4 | 2H | 85 | 1.5 | 25 |

As is clear from Table 4, the transparent conductive substrates according to the Embodiment 25, Embodiment 27, and Embodiment 28 have excellent characteristics as substrates for display apparatuses.

Thus, according to the transparent conductive substrate of the present invention, since the front surface of an metallic oxide layer or a metallic nitride oxide film is treated with a coupling agent, the metallic oxide layer or the metallic nitride oxide layer having steam barrier characteristic, oxygen barrier characteristic, and scratch resisting characteristic are strongly adhered to a heat resisting transparent resin base. In addition, a transparent electrode layer could be formed on an exposed surface of the metallic oxide layer or the metallic nitride layer that well fits to an inorganic substance. Thus, these layers are integrally formed as a transparent conductive substrate While a transparent conductive substrate is being fabricated, any defect such as delamination of each layer and film forming defect of the transparent conductive layer does not take place. In addition, since the transparent conductive substrate has various excellent characteristics without need to form a protection layer, an adhesive agent layer, and so forth on a steam/oxygen barrier layer unlike with the conventional substrates, thermal expansion between the adhesive agent layer and the transparent electrode layer does not take place. Thus, the transparent electrode layer is prevented from being peeled off. As a result, the heat resisting characteristic of the substrate is improved.

In addition, after a coupling agent process, the surface thereof is abraded. Thus, the adhesion to the transparent electrode layer is further improved. Consequently, the smoothness of the substrate is further improved.

On the other hand, when a thermosetting type allylated polyarylene ether resin with low optical anisotropy, low haze value, and high heat resisting characteristic is used as a bases a transparent conductive substrate that satisfactorily withstands the heat process in the fabrication thereof can be obtained.

Moreover, according to the fabrication method of the present invention, a silicon oxide layer with excellent scratch resisting characteristic and adhesion characteristic to the transparent electrode layer can be obtained along with excellent optical characteristics, oxygen barrier characteristic, and steam barrier characteristic In addition, the transparent conductive substrate with the above-described characteristics can be obtained by a simple process at a relative low temperature Thus, when the transparent conductive substrate with such a structure is used, excellent scratch resisting characteristic, adhesion characteristic of the base and the transparent electrode layer, light weight of the transparent conductive substrate, and shock resisting characteristic can be accomplished along with excellent oxygen barrier characteristic and steam barrier characteristic In addition, the transparent conductive substrate can be applied to a display apparatus by the same process as that for the conventional glass substrate.

Consequently, a small, thin, and light-weight display apparatus can be provided. It can be applied to a handy information terminal unit.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention

What is claimed is:

1. A transparent conductive substrate, comprising:
    a transparent heat resisting base with first and second main surfaces;
    a barrier layer formed on the first main surface of the transparent heat resisting resin base:
    a bonding layer formed on said barrier layer, the bonding layer functioning as an adhesive agent layer or an anchor coat layer;
    a transparent electrode layer formed on said bonding layer; and
    a hard coat layer formed on the second main surface of the transparent heat resisting resin base;
    wherein said transparent heat resisting resin base comprises a thermosetting type allylated polyarylene ether.

2. The transparent conductive substrate as set forth in claim 1,
    wherein the barrier layer is one member selected from the group consisting of a metallic oxide layer and a metallic nitride layer.

3. The transparent conductive substrate as set forth in claim 2,
    wherein the metallic oxide layer is a silicon oxide layer.

4. A transparent conductive substrate, comprising:
    a transparent composite base having a transparent heat resisting resin base and a silicon oxide layer, the silicon oxide layer being formed on at least one of first and second main surfaces of the transparent heat resisting resin base; and
    a transparent electrode layer formed on the silicon oxide layer formed on said first main surface of said transparent composite base.

5. The transparent conductive substrate as set forth in claim 4, wherein the transparent heat resisting resin base is formed of a thermosetting type allylated polyarylene ether.

6. A method of manufacturing a transparent conductive substrate as set forth in claim 4, comprising the step of forming the silicon oxide layer by the substeps of coating a solution of polyalkoxysiloxane containing a catalyst on the transparent heat resisting resin base, drying and heat-treating the coated transparent heat resisting resin base to form the silicon oxide layer.

7. A method of manufacturing a transparent conductive substrate as set forth in claim 4, comprising the step of forming the silicon oxide layer by the substeps of coating polysilane on the transparent heat resisting resin base, drying the coated resin base to form a polysilane film, radiating an ultraviolet ray on the polysilane film to be oxidized and heat-treating the oxidized film to form a thin silicon oxide film.

8. A method of manufacturing a transparent conductive substrate as set forth in claim 4, comprising the step of forming the silicon oxide layer by the substeps of coating a solution of polysilazane on the transparent heat resisting resin base, drying the coated resin base to form a polysilazane film, hydrolyzing and oxidizing the polysilazane film to form a silicon oxide film.

9. A display apparatus, comprising:
    a transparent conductive substrate comprising a transparent heat resisting resin base having a first main surface and a second main surface and formed of a heat resisting resin, an inorganic material layer formed on at least one of the first main surface and the second main surface to form a transparent composite base, the inorganic material layer comprising a coupling agent and an inorganic material selected from the group of metallic oxide and metallic nitride, and a transparent electrode layer formed directly on a surface of the inorganic layer formed on the first main surface;
    an opposite substrate disposed opposite to said transparent conductive substrate; and
    a liquid crystal layer disposed between said transparent conductive substrate and said opposite substrate.

10. A display apparatus, comprising:
    a transparent conductive substrate comprising a transparent heat resisting resin base formed of thermosetting type allylated polyarylene ether, the resin base having two main surfaces; and a transparent electrode layer formed on said transparent heat resisting resin base;

an opposite substrate disposed opposite to said transparent conductive substrate; and a liquid crystal layer disposed between said transparent conductive substrate and said opposite substrate.

11. A display apparatus, comprising:

a transparent conductive substrate comprising a transparent composite base having a transparent heat resisting resin base and a silicon oxide layer, the silicon oxide layer being formed on at least one of two main surfaces of the transparent heat resisting resin base, and a transparent electrode layer formed on the silicon oxide layer of said transparent composite base;

an opposite substrate disposed opposite to said transparent conductive substrate; and a liquid crystal layer disposed between said transparent conductive substrate and said opposite substrate.

12. A transparent conductive substrate, comprising:

a transparent heat resisting resin base having a first main surface and a second main surface and formed of a heat resisting resin;

an inorganic material layer formed on at least one of the first main surface and the second main surface to form a transparent composite base, the inorganic material layer comprising a coupling agent and an inorganic material selected from the group of metallic oxide and metallic nitride; and a transparent electrode layer formed directly on a surface of the inorganic material layer formed on the first main surface, wherein said inorganic material is exposed on a surface of said inorganic material layer.

13. The transparent conductive substrate as set forth in claim 12, wherein the heat resisting resin is at least one selected from the group consisting of polycarbonate, polyarylate, polysulfone, polyethersulfone, norbornene resin, and thermosetting type allylated polyphenylene ether.

14. The transparent conductive substrate as set forth in claim 13, wherein the heat resisting resin is thermosetting type allylated polyphenylene ether.

15. The transparent conductive substrate as set forth in claim 12, wherein a thickness of said heat resisting resin base is in a range of 0.03 to 1 mm.

16. The transparent conductive substrate as set forth in claim 12, wherein a thickness of said heat resisting resin base is in a range of 0.05 to 0.1 mm.

17. The transparent conductive substrate as set forth in claim 12, wherein said inorganic material is at least one oxide selected from the group consisting of aluminum oxide, silicon oxide, zinc oxide, and magnesium oxide.

18. The transparent conductive substrate as set forth in claim 12, wherein said inorganic material is silicon oxide represented by the chemical formula $SiO_x$, wherein x is in a range of 1.3 to 1.8.

19. The transparent conductive substrate as set forth in claim 12, wherein said inorganic material is aluminum oxide represented by the chemical formula $AlO_x$, wherein x is in a range of 1.2 to 1.5.

20. The transparent conductive substrate as set forth in claim 12, wherein said inorganic material is magnesium oxide represented by the chemical formula $MgO_x$, wherein x is in a range of 1.3 to 1.8.

21. The transparent conductive substrate as set forth in claim 12, wherein said inorganic material is silicon nitride represented by the chemical formula $SiN_x$, wherein x is in a range of 1 to 1.3.

22. The transparent conductive substrate as set forth in claim 12, wherein a thickness of said inorganic layer is in a range of 10 to 2000 nm.

23. The transparent conductive substrate as set forth in claim 12, wherein said coupling agent is at least one silane coupling agent selected from the group consisting of vinyl silane, acrylic silane, aminosilane, and epoxy silane.

24. A method of manufacturing a transparent conductive substrate, comprising the steps of:

preparing a transparent heat resisting resin base having first and second main surfaces;

forming an inorganic layer selected from the group consisting of a metallic oxide layer and a metallic nitride layer on at least one of said first and second main surfaces of the transparent heat resisting resin base, said inorganic layer having a plurality of pores;

treating the inorganic layer with a coupling agent to fill the pores by impregnating the coupling agent into the pores, and abrading a surface of the inorganic layer treated with the coupling agent until the inorganic layer is exposed.

25. The method of claim 24, wherein said inorganic layer is a silicon oxide layer, and the step of forming the inorganic layer further comprises substeps of dipping the transparent heat resisting resin base in a solution of hexafluorosilicic acid with supersaturated silica, hydrolizing the hexafluorosilicic acid to deposit the silicon oxide layer as the bonding layer on the transparent heat resisting resin base.

26. A method of manufacturing a transparent conductive substrate, comprising the steps of:

preparing a thermosetting type allylated polyarylene ether film as a transparent heat resisting resin base having two main surfaces;

forming a bonding layer on each of the two main surfaces; and forming a transparent electrode layer on one of the bonding layers.

27. The method of claim 26, wherein the bonding layer is a silicon oxide layer, and the step of forming the bonding layer further comprises the substeps of dipping the transparent heat resisting resin base in a solution of hexafluorosilicic acid with supersaturated silica, hydrolyzing the hexafluorosilicic acid to deposit the silicon oxide layer as the bonding layer on the transparent heat resisting resin base.

28. The method of claim 27, further comprising the substep of treating the bonding layer with a coupling agent prior to the step of forming the transparent electrode layer.

* * * * *

UNITED STATES PATENT AND TRADEMARK OFFICE
CERTIFICATE OF CORRECTION

PATENT NO.: 5,907,382

DATED: May 25, 1999

INVENTOR(S): Kajiura et al.

It is certified that an error appears in the above-identified patent and that said Letters Patent is hereby corrected as shown below:

Title page, item [57], line 12 of the Abstract, "surface" should read --surfaces--; and line 20 of the Abstract, "allyated" should read --allylated--.

*Claim 1, column 35, line 62, "base:" should read --base;--.

Signed and Sealed this

Eleventh Day of April, 2000

Attest:

Attesting Officer

Q. TODD DICKINSON

Director of Patents and Trademarks